US008139166B2

(12) United States Patent
Kuwata et al.

(10) Patent No.: US 8,139,166 B2
(45) Date of Patent: Mar. 20, 2012

(54) IMAGE PROJECTION APPARATUS AND PROJECTION OPTICAL SYSTEM

(75) Inventors: Muneharu Kuwata, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 888 days.

(21) Appl. No.: 12/222,732

(22) Filed: Aug. 14, 2008

(65) Prior Publication Data
US 2009/0273719 A1 Nov. 5, 2009

(30) Foreign Application Priority Data
Aug. 30, 2007 (JP) ................................. 2007-223668

(51) Int. Cl.
*H04N 5/64* (2006.01)
*H04N 9/31* (2006.01)

(52) U.S. Cl. ........ 348/744; 348/268; 348/269; 348/270; 348/273; 348/739; 348/742; 348/743; 348/745

(58) Field of Classification Search .......... 348/268–270, 348/273, 739, 742–745; 353/30, 31, 69; 359/649–652, 749, 754, 784–788
See application file for complete search history.

(56) References Cited

U.S. PATENT DOCUMENTS

| | | | | | |
|---|---|---|---|---|---|
| 5,517,340 | A | * | 5/1996 | Doany et al. ...................... | 349/5 |
| 5,795,047 | A | * | 8/1998 | Sannohe et al. ................ | 353/81 |
| 6,467,912 | B1 | * | 10/2002 | Kato ............... | 353/101 |
| 6,476,981 | B1 | * | 11/2002 | Shikama ........................ | 359/750 |
| 6,989,946 | B2 | * | 1/2006 | Kobayashi et al. ............ | 359/754 |
| 8,049,822 | B2 | * | 11/2011 | Amano et al. ................ | 348/744 |
| 2002/0005994 | A1 | * | 1/2002 | Shikama ........................ | 359/749 |
| 2002/0154418 | A1 | * | 10/2002 | Shikama ........................ | 359/754 |
| 2003/0202127 | A1 | * | 10/2003 | Hirata et al. .................... | 348/744 |
| 2003/0231261 | A1 | * | 12/2003 | Bassi et al. ..................... | 348/745 |
| 2005/0219711 | A1 | * | 10/2005 | Wada ............................. | 359/689 |
| 2006/0114430 | A1 | * | 6/2006 | Masubuchi et al. ............. | 353/99 |
| 2006/0244930 | A1 | * | 11/2006 | Hayashi et al. ................. | 353/97 |
| 2007/0064200 | A1 | * | 3/2007 | Ishibashi et al. ................ | 353/31 |
| 2007/0126993 | A1 | * | 6/2007 | Wang et al. ..................... | 353/94 |
| 2007/0201006 | A1 | * | 8/2007 | Amano et al. ................... | 353/31 |
| 2007/0217030 | A1 | * | 9/2007 | Muramatsu et al. .......... | 359/708 |
| 2007/0253076 | A1 | * | 11/2007 | Takaura et al. ............... | 359/780 |
| 2008/0158439 | A1 | * | 7/2008 | Nishikawa .................... | 348/744 |

FOREIGN PATENT DOCUMENTS

| | | |
|---|---|---|
| JP | 11-119091 A | 4/1999 |
| JP | 2004004964 A | 1/2004 |
| JP | 2006-350370 A | 12/2006 |
| JP | 2007150816 A | 6/2007 |

* cited by examiner

*Primary Examiner* — Pankaj Kumar
*Assistant Examiner* — Mulugeta Mengesha
(74) *Attorney, Agent, or Firm* — Birch, Stewart, Kolasch & Birch, LLP

(57) ABSTRACT

An image projection apparatus includes an image processing device, an illuminating device, a light valve, and a projection optical system; wherein the projection optical system is formed in such a way that at least one of a first deviation corresponding to an amount of the magnification chromatic aberration of a light having a central wavelength of the red light relative to the green light and a second deviation corresponding to an amount of the magnification chromatic aberration of the blue light relative to the green light is larger than a fixed-pixel pitch, and a third deviation corresponding to an amount of the magnification chromatic aberration of a light having a maximum wavelength of the red light relative to a light having a minimum wavelength of the red light is not larger than the fixed-pixel pitch; wherein the first deviation and/or the second deviation is eliminated by supplying the compensated video signal to the light valve.

19 Claims, 32 Drawing Sheets

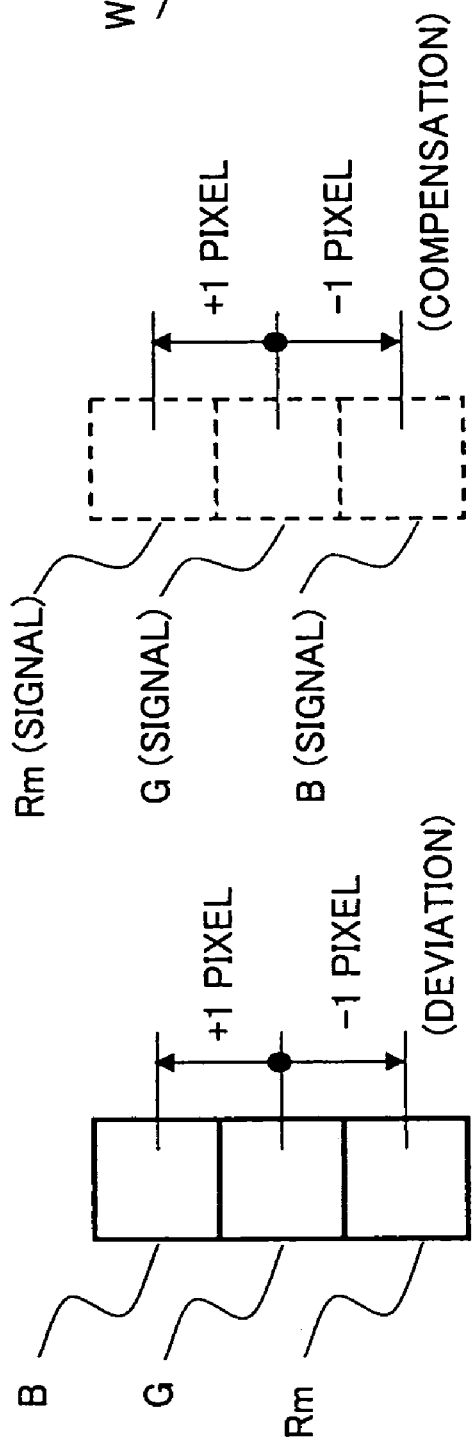

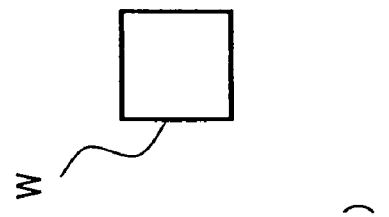
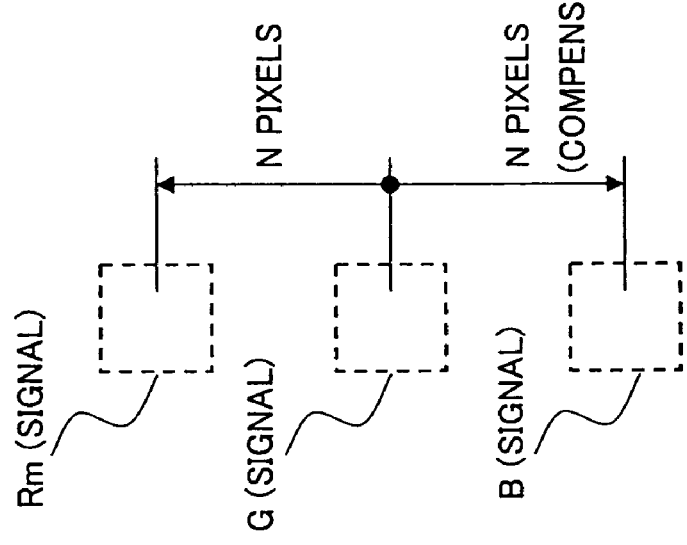
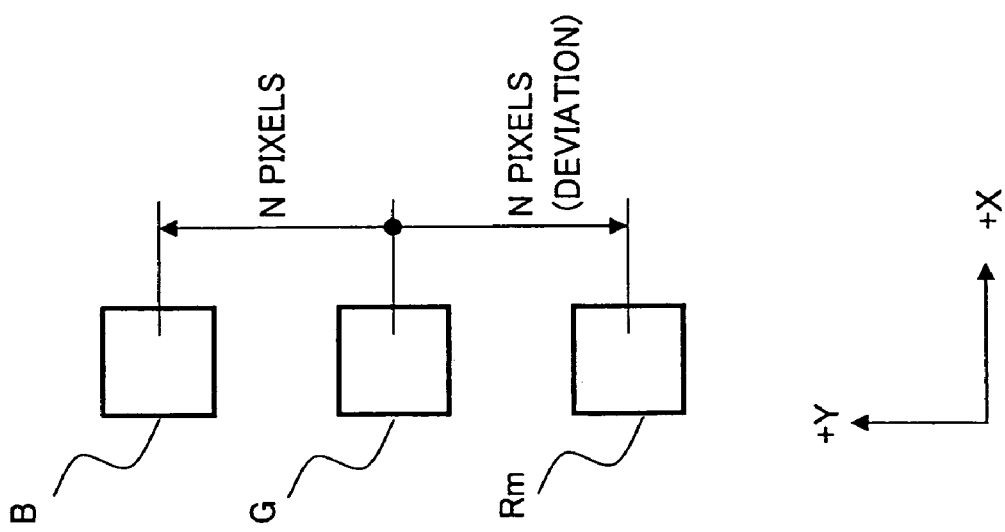

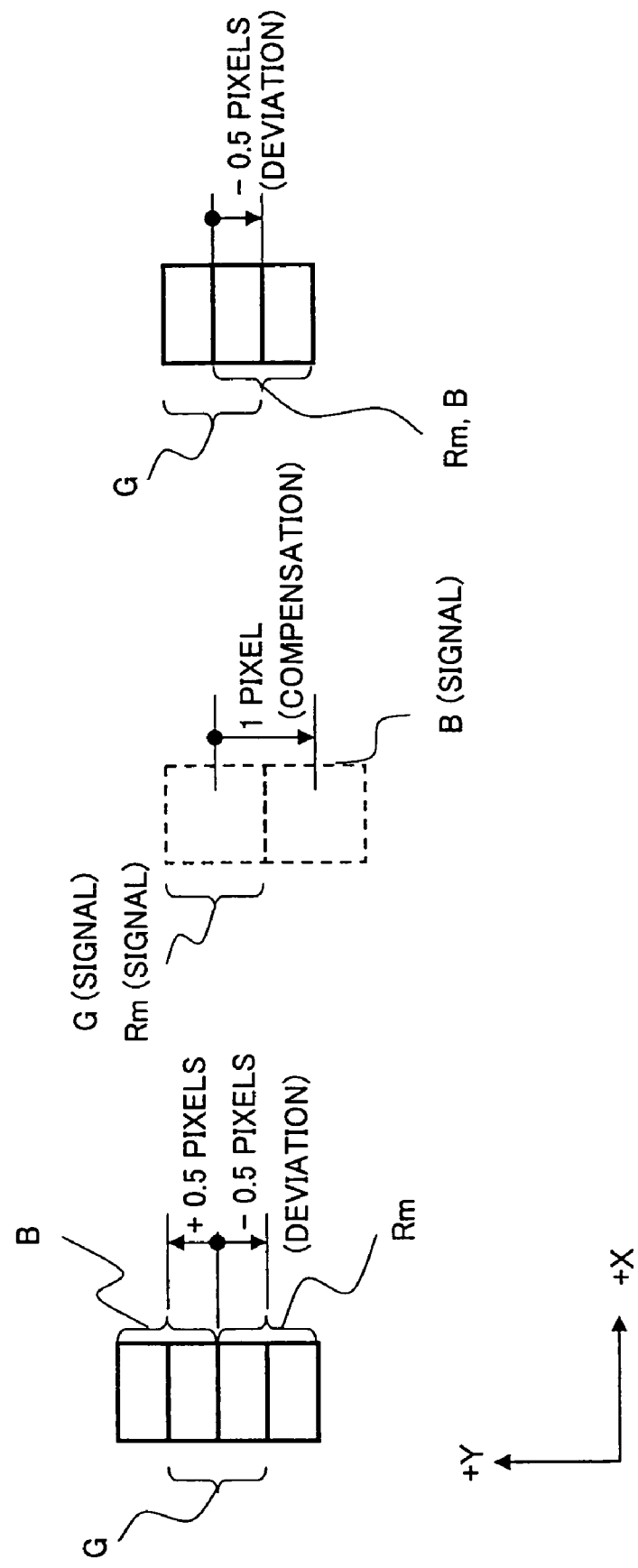

FIG. 9A

| FIRST EMBODIMENT | | | | |
|---|---|---|---|---|
| f = 6.327 | M = -1/103.5 | Fno = 2.4 | 2ω = 115° | lp = 587.51 |
| OPTICAL SURFACE Si (i = 1, ···, 20) | RADIUS OF CURVATURE Ri | SURFACE DISTANCE Di | REFRACTIVE INDEX nd | ABBE NUMBER |
| S1* | 66.911 | 5.433 | 1.49176 | 57.4 |
| S2* | 24.246 | 13.088 | | |
| S3 | 49.173 | 4.000 | 1.78590 | 43.9 |
| S4 | 27.741 | 17.753 | | |
| S5 | 160.869 | 3.000 | 1.77250 | 49.6 |
| S6 | 26.636 | 77.147 | | |
| S7 | 57.524 | 4.640 | 1.80518 | 25.5 |
| S8 | -1129.144 | 27.150 | | |
| S9 (APERTURE STOP) | Infinity | 9.725 | | |
| S10 | 46.899 | 6.770 | 1.48749 | 70.4 |
| S11 | -15.824 | 0.200 | | |
| S12 | -15.943 | 1.633 | 1.80610 | 33.3 |
| S13 | 23.957 | 8.282 | 1.48749 | 70.4 |
| S14 | -25.273 | 0.200 | | |
| S15 | 52.636 | 10.490 | 1.56732 | 42.8 |
| S16 | -19.248 | 9.176 | 1.80518 | 25.5 |
| S17 | -28.064 | 26.798 | | |
| S18 | Infinity | 1.050 | 1.50690 | 63.1 |
| S19 | Infinity | 1.100 | | |
| S20 | Infinity | | | |

FIG. 9B

| ASPHERICAL DATA | | |
|---|---|---|
| K, Aj (j = 1, ···, 14) | S1 | S2 |
| K | 4.400042E-01 | -7.718913E-01 |
| A1 | 0.000000E+00 | 0.000000E+00 |
| A2 | -3.835838E-03 | -5.069088E-03 |
| A3 | -5.656628E-05 | 1.065582E-04 |
| A4 | 4.610882E-06 | -7.771014E-06 |
| A5 | -9.710895E-09 | 2.698525E-07 |
| A6 | -4.603060E-09 | -1.026756E-08 |
| A7 | 8.671851E-11 | 1.253753E-10 |
| A8 | 4.757787E-13 | 4.524626E-12 |
| A9 | -1.477591E-14 | -3.902981E-14 |
| A10 | 4.692541E-17 | -5.581060E-16 |
| A11 | -1.286612E-18 | 3.449578E-18 |
| A12 | -1.179685E-20 | -4.995859E-20 |
| A13 | 3.847226E-23 | -3.662154E-21 |
| A14 | 8.219223E-24 | -1.838630E-22 |

FIG. 13A

| SECOND EMBODIMENT | | | | |
|---|---|---|---|---|
| f = 6.470 | M = −1/103.05 | Fno = 2.4 | 2ω = 115° | Ip = 592.25 |
| OPTICAL SURFACE Si (i = 1, ···, 21) | RADIUS OF CURVATURE Ri | SURFACE DISTANCE Di | REFRACTIVE INDEX nd | ABBE NUMBER |
| S1* | 78.706 | 5.433 | 1.49176 | 57.4 |
| S2* | 19.619 | 6.785 | | |
| S3 | 51.672 | 3.000 | 1.74320 | 49.3 |
| S4 | 29.453 | 19.128 | | |
| S5 | 193.594 | 2.000 | 1.80420 | 46.5 |
| S6 | 28.765 | 87.533 | | |
| S7 | 54.609 | 4.224 | 1.80518 | 25.5 |
| S8 | 673.666 | 23.570 | | |
| S9 (APERTURE STOP) | Infinity | 12.007 | | |
| S10 | 73.690 | 8.771 | 1.48749 | 70.4 |
| S11 | −16.069 | 0.200 | | |
| S12 | −16.197 | 2.537 | 1.80610 | 33.3 |
| S13 | 29.617 | 7.437 | 1.48749 | 70.4 |
| S14 | −32.156 | 0.200 | | |
| S15 | 48.466 | 16.586 | 1.48749 | 70.4 |
| S16 | −45.192 | 0.200 | | |
| S17 | −356.485 | 5.661 | 1.75500 | 52.3 |
| S18 | −56.383 | 26.798 | | |
| S19 | Infinity | 1.050 | 1.50690 | 63.1 |
| S20 | Infinity | 1.100 | | |
| S21 | Infinity | | | |

FIG. 13B

| ASPHERICAL DATA | | |
|---|---|---|
| K, Aj (j = 1, ···, 10) | S1 | S2 |
| K | 1.133789E+00 | −3.957711E+00 |
| A1 | 0.000000E+00 | 0.000000E+00 |
| A2 | −1.661025E−02 | −2.593198E−02 |
| A3 | 5.185461E−04 | 1.102452E−03 |
| A4 | −3.805424E−06 | −1.456727E−05 |
| A5 | −7.939967E−08 | 4.694701E−07 |
| A6 | −1.163020E−09 | −1.853766E−08 |
| A7 | 8.645139E−11 | 1.359286E−10 |
| A8 | 1.230722E−13 | 6.452587E−12 |
| A9 | −3.520656E−14 | −1.470614E−14 |
| A10 | 3.415225E−16 | −1.725456E−15 |

FIG. 16A

| THIRD EMBODIMENT | | | | |
|---|---|---|---|---|
| f = 6.320 | M = -1/103.05 | Fno = 2.4 | 2ω = 115° | lp = 587.33 |
| OPTICAL SURFACE Si (i = 1, ···, 20) | RADIUS OF CURVATURE Ri | SURFACE DISTANCE Di | REFRACTIVE INDEX nd | ABBE NUMBER |
| S1* | 66.972 | 5.433 | 1.49176 | 57.4 |
| S2* | 24.269 | 12.556 | | |
| S3 | 49.095 | 4.000 | 1.78590 | 43.9 |
| S4 | 27.796 | 17.780 | | |
| S5 | 160.622 | 3.000 | 1.77250 | 49.6 |
| S6 | 26.768 | 78.405 | | |
| S7 | 54.620 | 4.508 | 1.80518 | 25.5 |
| S8 | -152761.400 | 25.630 | | |
| S9 (APERTURE STOP) | Infinity | 9.587 | | |
| S10 | 47.598 | 6.877 | 1.48749 | 70.4 |
| S11 | -15.845 | 0.200 | | |
| S12 | -15.963 | 1.821 | 1.80610 | 33.3 |
| S13 | 24.151 | 8.206 | 1.48749 | 70.4 |
| S14 | -25.432 | 0.200 | | |
| S15 | 52.200 | 10.386 | 1.56732 | 42.8 |
| S16 | -19.268 | 9.468 | 1.80518 | 25.5 |
| S17 | -28.259 | 26.798 | | |
| S18 | Infinity | 1.05 | 1.506903 | 63.1 |
| S19 | Infinity | 1.1 | | |
| S20 | Infinity | | | |

FIG. 16B

| ASPHERICAL DATA | | |
|---|---|---|
| K, Aj (j = 1, ···, 14) | S1 | S2 |
| K | 4.496509E-01 | -7.716717E-01 |
| A1 | 0.000000E+00 | 0.000000E+00 |
| A2 | -4.037316E-03 | -5.220285E-03 |
| A3 | -5.683530E-05 | 1.014335E-04 |
| A4 | 4.633038E-06 | -7.824960E-06 |
| A5 | -9.583864E-09 | 2.688640E-07 |
| A6 | -4.608413E-09 | -1.026989E-08 |
| A7 | 8.662234E-11 | 1.256486E-10 |
| A8 | 4.755529E-13 | 4.532637E-12 |
| A9 | -1.475238E-14 | -3.887887E-14 |
| A10 | 4.759917E-17 | -5.554098E-16 |
| A11 | -1.275947E-18 | 3.519926E-18 |
| A12 | -1.173874E-20 | -4.727101E-20 |
| A13 | 3.534894E-23 | -3.553541E-21 |
| A14 | 8.060290E-24 | -1.798074E-22 |

FIG. 19A

| FOURTH EMBODIMENT | | | | |
|---|---|---|---|---|
| f = 6.47158 | M = -1/103.05 | Fno = 2.4 | 2ω = 115° | lp = 591.35 |
| OPTICAL SURFACE Si (i = 1, ···, 21) | RADIUS OF CURVATURE Ri | SURFACE DISTANCE Di | REFRACTIVE INDEX nd | ABBE NUMBER |
| S1* | 79.138 | 5.433 | 1.49176 | 57.4 |
| S2* | 19.543 | 6.104 | | |
| S3 | 50.334 | 3.000 | 1.74320 | 49.3 |
| S4 | 28.981 | 18.630 | | |
| S5 | 174.349 | 2.000 | 1.80420 | 46.5 |
| S6 | 28.495 | 87.533 | | |
| S7 | 54.860 | 4.369 | 1.80518 | 25.5 |
| S8 | 689.902 | 23.805 | | |
| S9 (APERTURE STOP) | Infinity | 11.081 | | |
| S10 | 67.883 | 8.366 | 1.48749 | 70.4 |
| S11 | -16.166 | 0.200 | | |
| S12 | -16.281 | 1.000 | 1.80610 | 33.3 |
| S13 | 31.213 | 6.805 | 1.48749 | 70.4 |
| S14 | -32.720 | 0.200 | | |
| S15 | 53.298 | 16.481 | 1.48749 | 70.4 |
| S16 | -43.549 | 0.200 | | |
| S17 | -281.030 | 6.231 | 1.75500 | 52.3 |
| S18 | -54.291 | 26.798 | | |
| S19 | Infinity | 1.050 | 1.50690 | 63.1 |
| S20 | Infinity | 1.100 | | |
| S21 | Infinity | | | |

FIG. 19B

| ASPHERICAL DATA | | |
|---|---|---|
| K, Aj (j = 1, ···, 14) | S1 | S2 |
| K | 1.123882E+00 | -4.161166E+00 |
| A1 | 0.000000E+00 | 0.000000E+00 |
| A2 | -1.670218E-02 | -2.537854E-02 |
| A3 | 5.173895E-04 | 1.107468E-03 |
| A4 | -3.799339E-06 | -1.454236E-05 |
| A5 | -7.906341E-08 | 4.684393E-07 |
| A6 | -1.159339E-09 | -1.856909E-08 |
| A7 | 8.641050E-11 | 1.353579E-10 |
| A8 | 1.208866E-13 | 6.445599E-12 |
| A9 | -3.527535E-14 | -1.471281E-14 |
| A10 | 3.398113E-16 | -1.722124E-15 |

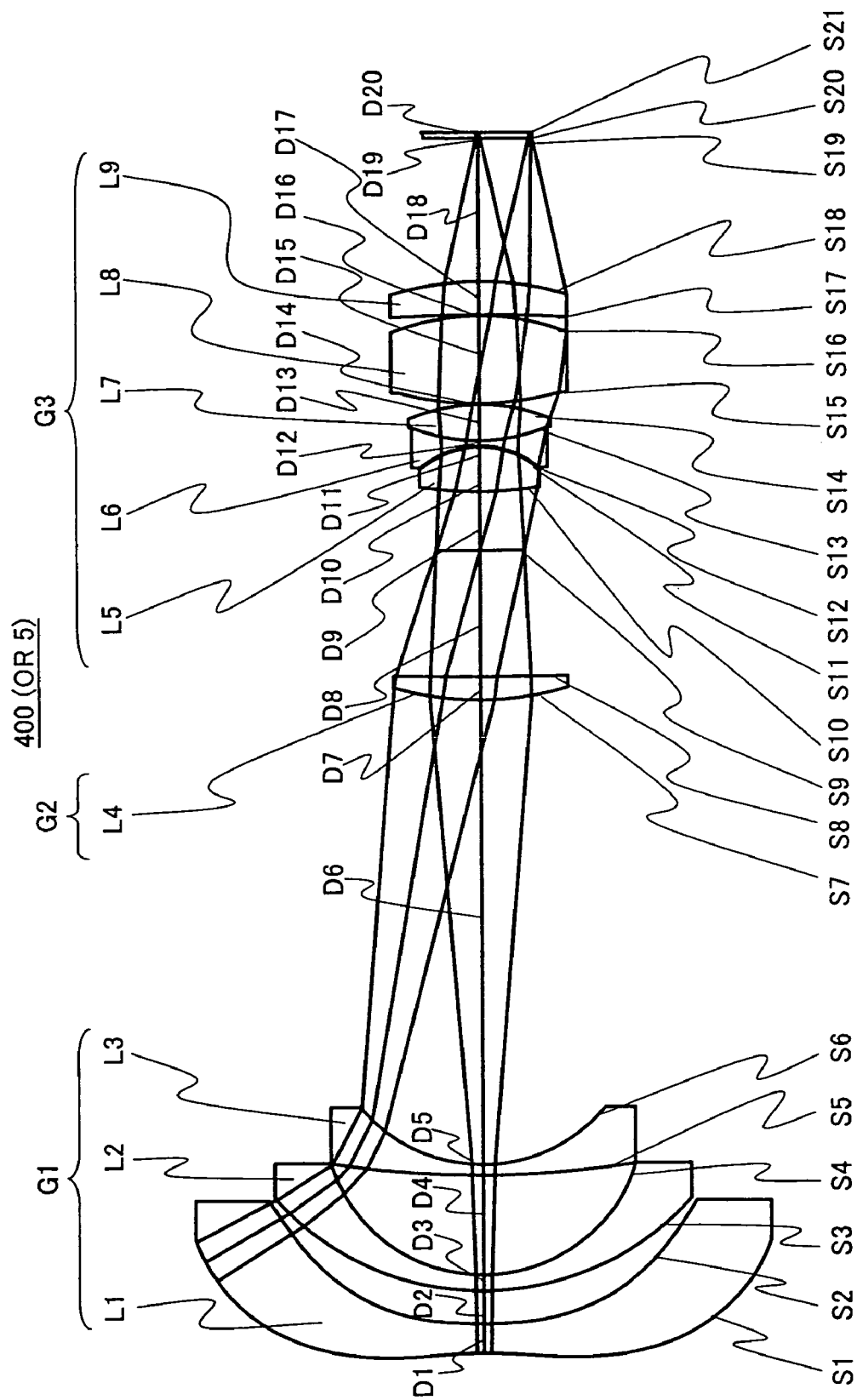

FIG. 22A

| FIFTH EMBODIMENT ||||||
|---|---|---|---|---|
| f = 6.390 | M = −1/103.05 | Fno = 2.4 | 2ω = 115° | lp = 589.76 |
| OPTICAL SURFACE Si (i = 1, ···, 20) | RADIUS OF CURVATURE Ri | SURFACE DISTANCE Di | REFRACTIVE INDEX nd | ABBE NUMBER |
| S1* | 66.901 | 5.433 | 1.49176 | 57.4 |
| S2* | 24.253 | 13.267 | | |
| S3 | 49.471 | 4.000 | 1.78590 | 43.9 |
| S4 | 27.736 | 18.046 | | |
| S5 | 185.254 | 3.000 | 1.77250 | 49.6 |
| S6 | 26.865 | 75.367 | | |
| S7 | 65.331 | 11.273 | 1.80518 | 25.5 |
| S8 | −347.624 | 29.021 | | |
| S9 (APERTURE STOP) | Infinity | 9.721 | | |
| S10 | 46.788 | 6.818 | 1.48749 | 70.4 |
| S11 | −15.769 | 0.200 | | |
| S12 | −15.914 | 2.399 | 1.80610 | 33.3 |
| S13 | 24.252 | 8.508 | 1.48749 | 70.4 |
| S14 | −25.145 | 0.200 | | |
| S15 | 52.854 | 10.996 | 1.56732 | 42.8 |
| S16 | −19.132 | 8.589 | 1.80518 | 25.5 |
| S17 | −28.002 | 26.798 | | |
| S18 | Infinity | 1.05 | 1.506903 | 63.1 |
| S19 | Infinity | 1.1 | | |
| S20 | Infinity | | | |

FIG. 22B

| ASPHERICAL DATA |||
|---|---|---|
| K, Aj (j = 1, ···, 14) | S1 | S2 |
| K | 4.405749E−01 | −7.714437E−01 |
| A1 | 0.000000E+00 | 0.000000E+00 |
| A2 | −3.822168E−03 | −5.248230E−03 |
| A3 | −5.637469E−05 | 1.062627E−04 |
| A4 | 4.608729E−06 | −7.755679E−06 |
| A5 | −9.943303E−09 | 2.706840E−07 |
| A6 | −4.603069E−09 | −1.024440E−08 |
| A7 | 8.680254E−11 | 1.259147E−10 |
| A8 | 4.772162E−13 | 4.536121E−12 |
| A9 | −1.475826E−14 | −3.880740E−14 |
| A10 | 4.708847E−17 | −5.545666E−16 |
| A11 | −1.286194E−18 | 3.476145E−18 |
| A12 | −1.183035E−20 | −5.115361E−20 |
| A13 | 3.719681E−23 | −3.747112E−21 |
| A14 | 8.184812E−24 | −1.875926E−22 |

FIG. 25A

| | SIXTH EMBODIMENT | | | |
|---|---|---|---|---|
| f = 6.54362 | M = -1/103.05 | Fno = 2.4 | $2\omega$ = 115° | lp = 589.33 |
| OPTICAL SURFACE Si (i = 1, ···, 21) | RADIUS OF CURVATURE Ri | SURFACE DISTANCE Di | REFRACTIVE INDEX nd | ABBE NUMBER |
| S1* | 76.839 | 5.433 | 1.49176 | 57.4 |
| S2* | 16.781 | 6.319 | | |
| S3 | 49.880 | 3.000 | 1.74320 | 49.3 |
| S4 | 30.171 | 20.201 | | |
| S5 | 276.786 | 2.000 | 1.80420 | 46.5 |
| S6 | 27.868 | 87.533 | | |
| S7 | 60.402 | 4.481 | 1.80518 | 25.5 |
| S8 | -6190.467 | 26.706 | | |
| S9 (APERTURE STOP) | Infinity | 11.058 | | |
| S10 | 68.532 | 10.733 | 1.48749 | 70.4 |
| S11 | -16.124 | 0.200 | | |
| S12 | -16.313 | 3.207 | 1.80610 | 33.3 |
| S13 | 26.587 | 7.576 | 1.48749 | 70.4 |
| S14 | -35.173 | 0.200 | | |
| S15 | 45.570 | 14.725 | 1.48749 | 70.4 |
| S16 | -39.468 | 0.200 | | |
| S17 | -424.249 | 6.894 | 1.75500 | 52.3 |
| S18 | -61.062 | 26.798 | | |
| S19 | Infinity | 1.050 | 1.50690 | 63.1 |
| S20 | Infinity | 1.100 | | |
| S21 | Infinity | | | |

FIG. 25B

| | ASPHERICAL DATA | |
|---|---|---|
| K, Aj (j = 1, ···, 10) | S1 | S2 |
| K | 1.130765E+00 | -3.318395E+00 |
| A1 | 0.000000E+00 | 0.000000E+00 |
| A2 | -1.675474E-02 | -3.091584E-02 |
| A3 | 5.106020E-04 | 1.236388E-03 |
| A4 | -3.949165E-06 | -1.561996E-05 |
| A5 | -8.043908E-08 | 4.431200E-07 |
| A6 | -1.151181E-09 | -1.905455E-08 |
| A7 | 8.689788E-11 | 1.300859E-10 |
| A8 | 1.276307E-13 | 6.522413E-12 |
| A9 | -3.529013E-14 | -7.594370E-15 |
| A10 | 3.390279E-16 | -1.426018E-15 |

FIG. 28A

| SEVENTH EMBODIMENT ||||||
|---|---|---|---|---|
| f = 6.307 | M = −1/90.37 | Fno = 2.4 | 2ω = 115° | Ip = 507.54 |
| OPTICAL SURFACE Si (i = 1, ···, 20) | RADIUS OF CURVATURE Ri | SURFACE DISTANCE Di | REFRACTIVE INDEX nd | ABBE NUMBER |
| S1* | 66.924 | 5.433 | 1.49176 | 57.4 |
| S2* | 24.236 | 13.130 | | |
| S3 | 49.167 | 4.000 | 1.78590 | 43.9 |
| S4 | 27.728 | 17.764 | | |
| S5 | 161.837 | 3.000 | 1.77250 | 49.6 |
| S6 | 26.654 | 77.090 | | |
| S7 | 56.784 | 4.630 | 1.80518 | 25.5 |
| S8 | −1538.868 | 26.979 | | |
| S9 (APERTURE STOP) | Infinity | 9.676 | | |
| S10 | 46.775 | 6.813 | 1.48749 | 70.4 |
| S11 | −15.837 | 0.200 | | |
| S12 | −15.950 | 1.542 | 1.80610 | 33.3 |
| S13 | 23.908 | 8.274 | 1.48749 | 70.4 |
| S14 | −25.207 | 0.200 | | |
| S15 | 52.774 | 10.448 | 1.56732 | 42.8 |
| S16 | −19.266 | 9.290 | 1.80518 | 25.5 |
| S17 | −28.065 | 26.798 | | |
| S18 | Infinity | 1.050 | 1.50690 | 63.1 |
| S19 | Infinity | 1.100 | | |
| S20 | Infinity | | | |

FIG. 28B

| | ASPHERICAL DATA ||
|---|---|---|
| K, Aj (j = 1, ···, 14) | S1 | S2 |
| K | 4.385627E−01 | −8.558896E−01 |
| A1 | 0.000000E+00 | 0.000000E+00 |
| A2 | −3.845395E−03 | −5.035171E−03 |
| A3 | 5.121226E−05 | 3.427501E−04 |
| A4 | 2.059388E−06 | −1.911728E−05 |
| A5 | −4.448374E−08 | 4.683606E−07 |
| A6 | −4.083713E−09 | −9.687635E−09 |
| A7 | 1.003702E−10 | 5.347371E−11 |
| A8 | 4.877472E−13 | 3.737372E−12 |
| A9 | −1.615807E−14 | −3.163004E−14 |
| A10 | 1.454185E−17 | 1.041150E−16 |
| A11 | −1.725612E−18 | 1.903604E−17 |
| A12 | −9.015338E−21 | 2.335143E−19 |
| A13 | 1.079288E−22 | −6.417133E−21 |
| A14 | 9.354084E−24 | −4.293325E−22 |

FIG. 31A

| EIGHTH EMBODIMENT | | | | |
|---|---|---|---|---|
| f = 6.346 | M = -1/115.74 | Fno = 2.4 | 2ω = 115° | lp = 666.50 |
| OPTICAL SURFACE Si (i = 1, ⋯, 20) | RADIUS OF CURVATURE Ri | SURFACE DISTANCE Di | REFRACTIVE INDEX nd | ABBE NUMBER |
| S1* | 66.834 | 5.433 | 1.49176 | 57.4 |
| S2* | 24.231 | 13.368 | | |
| S3 | 49.188 | 4.000 | 1.78590 | 43.9 |
| S4 | 27.724 | 17.684 | | |
| S5 | 156.718 | 3.000 | 1.77250 | 49.6 |
| S6 | 26.599 | 76.820 | | |
| S7 | 56.603 | 4.644 | 1.80518 | 25.5 |
| S8 | -1638.291 | 27.181 | | |
| S9 (APERTURE STOP) | Infinity | 9.559 | | |
| S10 | 46.141 | 6.755 | 1.48749 | 70.4 |
| S11 | -15.782 | 0.200 | | |
| S12 | -15.899 | 1.618 | 1.80610 | 33.3 |
| S13 | 23.747 | 8.222 | 1.48749 | 70.4 |
| S14 | -25.473 | 0.200 | | |
| S15 | 52.350 | 10.445 | 1.56732 | 42.8 |
| S16 | -19.244 | 8.944 | 1.80518 | 25.5 |
| S17 | -27.911 | 26.798 | | |
| S18 | Infinity | 1.050 | 1.50690 | 63.1 |
| S19 | Infinity | 1.100 | | |
| S20 | Infinity | | | |

FIG. 31B

| | ASPHERICAL DATA | |
|---|---|---|
| K, Aj (j = 1, ⋯, 14) | S1 | S2 |
| K | 4.350328E-01 | -7.718145E-01 |
| A1 | 0.000000E+00 | 0.000000E+00 |
| A2 | -3.710022E-03 | -5.012187E-03 |
| A3 | -5.671515E-05 | 1.077273E-04 |
| A4 | 4.586787E-06 | -7.741394E-06 |
| A5 | -9.812638E-09 | 2.707648E-07 |
| A6 | -4.597927E-09 | -1.025802E-08 |
| A7 | 8.680854E-11 | 1.253859E-10 |
| A8 | 4.765890E-13 | 4.523858E-12 |
| A9 | -1.478089E-14 | -3.902404E-14 |
| A10 | 4.657806E-17 | -5.575427E-16 |
| A11 | -1.294358E-18 | 3.452102E-18 |
| A12 | -1.189874E-20 | -5.080513E-20 |
| A13 | 3.847512E-23 | -3.718457E-21 |
| A14 | 8.273080E-24 | -1.863588E-22 |

800 (OR 5)

IMAGE PROJECTION APPARATUS AND PROJECTION OPTICAL SYSTEM

BACKGROUND OF THE INVENTION

1. Field of the Invention

The present invention relates to an image projection apparatus for magnifying and projecting red, green, and blue image lights modulated by a light valve to display a color image on a screen and a projection optical system included in the image projection apparatus.

2. Description of the Related Art

In image projection apparatuses, a light valve having a plurality of fixed pixels modulates a light emitted from a light source in accordance with an input video signal to produce an image light, and a projection optical system magnifies and projects the produced image light on a screen. In general, image projection apparatuses are roughly classified into two types, a front-projection type image projection apparatus using a reflective (or diffusive) type screen and a rear-projection type image projection apparatus including a transmissive type screen. In recent years, there are a strong demand for a shorter projection distance in the front-projection type image projection apparatus and a strong demand for a smaller depth (or slim shape) of the rear-projection type image projection apparatus. To satisfy these demands, the projection optical systems are required to have a wide angle of view.

In general, when the projection optical system has a wide angle of view, the chromatic aberration of magnification (i.e., magnification chromatic aberration) increases. This makes it difficult to display a high quality image on a screen. The magnification chromatic aberration means a phenomenon, in which positions of images of respective colors formed on a screen are different (or deviated) to each other. This occurs because refractivities of the lens are different depending on wavelengths of the lights and image formation magnifications are also different depending on wavelengths of the lights.

Particularly, in the case of the field-sequential type image projection apparatus in which the image lights are formed by a single light valve and the images of blue, green and red primary colors are superimposed on a screen in a time sharing manner, a color blur in the projected images occurs in an area where the images of blue, green and red primary colors are not superimposed due to the color deviation of the projected images, thereby impairing sharpness of the displayed image.

In order to eliminate the color deviation, there is a proposal of a projection optical system using an anomalous dispersion glass having an Abbe number exceeding a value of 80 to decrease the magnification chromatic aberration. See Patent Document 1, Japanese Patent Application Kokai (Laid-open) Publication No. 11-119091 (paragraph 0064). Further, there is another proposal of an image projection apparatus for compensating an input video signal by the predetermined image processing in order to cancel out the distortion or the magnification chromatic aberration induced in the projection system. See Patent Document 2, Japanese Patent Application Kokai (Laid-open) Publication No. 2006-350370 (paragraphs 0019 to 0047).

However, since the projection optical system disclosed in Patent Document 1 uses the anomalous dispersion glass that is expensive and difficult to be manufactured, this projection optical system requires high manufacturing cost.

Further, since the image projection apparatus disclosed in Patent Document 2 does not require the anomalous dispersion glass, a projection optical system in this image projection apparatus having a wide angle of view can be implemented with comparatively low cost. However, there is a problem when the image projection apparatus uses, for example, a super high pressure mercury lamp as a light source. As shown in FIG. 1, the super high pressure mercury lamp has spectral radiant characteristic including sharp emission-line spectrums in blue and green wavelength ranges and a continuous spectrum (not an emission-line spectrum) in a red wavelength range. Even when the magnification chromatic aberration of the projection optical system is conspicuous, amounts of the magnification chromatic aberrations of the blue light and the green light are small because a radiation spectrum of each light is narrow. Therefore, a color blur in the blue and green pixels displayed on the screen is small.

However, when the magnification chromatic aberration of the projection optical system is conspicuous, only the magnification chromatic aberration of the red light is conspicuous because the radiation spectrum of the red light is a continuous spectrum and there are a significant difference between the magnification chromatic aberrations of the light having a minimum wavelength and the light having a maximum wavelength in a wavelength range of the red light (also referred to as "magnification chromatic aberration within the red light"). This leads to an increased color blur in the red pixel displayed on the screen. Therefore, it is impossible to accurately superimpose the blue pixel and/or the green pixel on the red pixel on a screen by image processing of the input video signal because the red pixel is much larger than the green and blue pixels. In other words, the blue pixel and the green pixel can be superimposed to each other nearly completely, but the red pixel cannot be superimposed on the green or blue pixel completely. As a result, when the white pixel is intended to be displayed on a screen, a pixel actually displayed on the screen is greenish white at a central portion of the pixel and reddish at both side portions of the pixel. Accordingly, an image having original colors cannot be displayed sharply on the screen.

SUMMARY OF THE INVENTION

It is therefore an object of the present invention to provide an image projection apparatus having a small depth or a short projection distance at a low cost that can display a sharp color image having little color blur and a projection optical system used in the image projection apparatus.

According to the present invention, an image projection apparatus includes an image processing device receiving an input video signal and image-processing the received input video signal to generate an compensated video signal; an illuminating device sequentially emitting a red light, a green light, and a blue light, as an illuminating light, the red light having a continuous spectrum in a red wavelength range, the green light having an emission-line spectrum in a green wavelength range, the blue light having an emission-line spectrum in a blue wavelength range; a light valve including a plurality of fixed pixels arranged two-dimensionally with a predetermined fixed-pixel pitch and receiving the compensated video signal, the plurality of fixed pixels modulating the illuminating light to sequentially produce a red image light from the red light, a green image light from the green light, and a blue image light from the blue light in accordance with the received compensated video signal; and a projection optical system sequentially receiving the red image light, the green image light, and the blue image light, and magnifying and projecting the red image light, the green image light, and the blue image light on the screen, a magnification chromatic aberration for each color being induced in the projection optical system. The projection optical system is formed in such a way that at least one of a first deviation as a length on the light valve corresponding to an amount of the magnification chromatic aberration of a light having a central wavelength of the red light relative to the green light and a second deviation as a length on the light valve corresponding to an amount of the magnification chromatic aberration of the blue light relative to the green light is larger than a fixed-pixel pitch between adjacent fixed pixels of the light valve, and a third deviation as a length on the light valve corresponding to an amount of the magnification chromatic aberration of a light having a maximum wavelength of the red light relative to a light having a minimum wavelength of the red light is not larger than the fixed-pixel pitch. The image processing device includes a compensation data memory storing compensation data determined in advance in accordance with the projection optical system, and a signal processor performing the image-processing using the stored compensation-data to produce the compensated video signal, the first deviation and/or the second deviation being eliminated by supplying the compensated video signal to the light valve.

Furthermore, a projection optical system includes an optical member sequentially receiving a red image light, a green image light, and a blue image light from a light valve including a plurality of fixed pixels arranged two-dimensionally with a predetermined fixed-pixel pitch and receiving a compensated video signal from an image processing device, the optical member magnifying and projecting the red image light, the green image light, and the blue image light on a screen, a magnification chromatic aberration for each color being induced in the optical member. The optical member is formed in such a way that at least one of a first deviation as a length on the light valve corresponding to an amount of the magnification chromatic aberration of a light having a central wavelength of the red light relative to the green light and a second deviation as a length on the light valve corresponding to an amount of the magnification chromatic aberration of the blue light relative to the green light is larger than a fixed-pixel pitch between adjacent fixed pixels of the light valve, and a third deviation as a length on the light valve corresponding to an amount of the magnification chromatic aberration of a light having a maximum wavelength of the red light relative to a light having a minimum wavelength of the red light is not larger than the fixed-pixel pitch.

According to the present invention, it is possible to provide an image projection apparatus with a small depth small depth or a short projection distance that can project a sharp image having little color blur and having original colors based on the input video signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A to 6C are diagrams for describing the principle of compensation of the magnification chromatic aberrations of the blue light and a light having a central wavelength in the red light by image processing;

FIGS. 7A to 7C are diagrams for describing the principle of compensation of the magnification chromatic aberrations of the blue light and a light having a central wavelength in the red light by image processing;

FIGS. 8A to 8C are diagrams for describing the principle of compensation of the magnification chromatic aberrations of the blue light and a light having a central wavelength in the red light by image processing;

FIGS. 9A and 9B are diagrams showing a numerical example of the projection optical system and aspherical data of surfaces of the first lens of the projection optical system according to the first embodiment of the present invention;

FIGS. 13A and 13B are diagrams showing a numerical example of the projection optical system and aspherical data of surfaces of the first lens of the projection optical system according to the second embodiment of the present invention;

FIGS. 16A and 16B are diagrams showing a numerical example of the projection optical system and aspherical data of surfaces of the first lens of the projection optical system according to the third embodiment of the present invention;

FIGS. 19A and 19B are diagrams showing a numerical example of the projection optical system and aspherical data of surfaces of the first lens of the projection optical system according to the fourth embodiment of the present invention;

FIG. 20 is a diagram schematically showing a structure of the projection optical system according to the fourth embodiment;

FIGS. 22A and 22B are diagrams showing a numerical example of the projection optical system and aspherical data of surfaces of the first lens of the projection optical system according to the fifth embodiment of the present invention;

FIGS. 25A and 25B are diagrams showing a numerical example of the projection optical system and aspherical data of surfaces of the first lens of the projection optical system according to the sixth embodiment of the present invention;

FIGS. 28A and 28B are diagrams showing a numerical example of the projection optical system and aspherical data of surfaces of the first lens of the projection-optical system according to the seventh embodiment of the present invention;

FIGS. 31A and 31B are diagrams showing a numerical example of the projection optical system and aspherical data of surfaces of the first lens of the projection optical system according to the eighth embodiment of the present invention;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

An image projection apparatus according to the first embodiment of the present invention will be described below.

Figure 2:
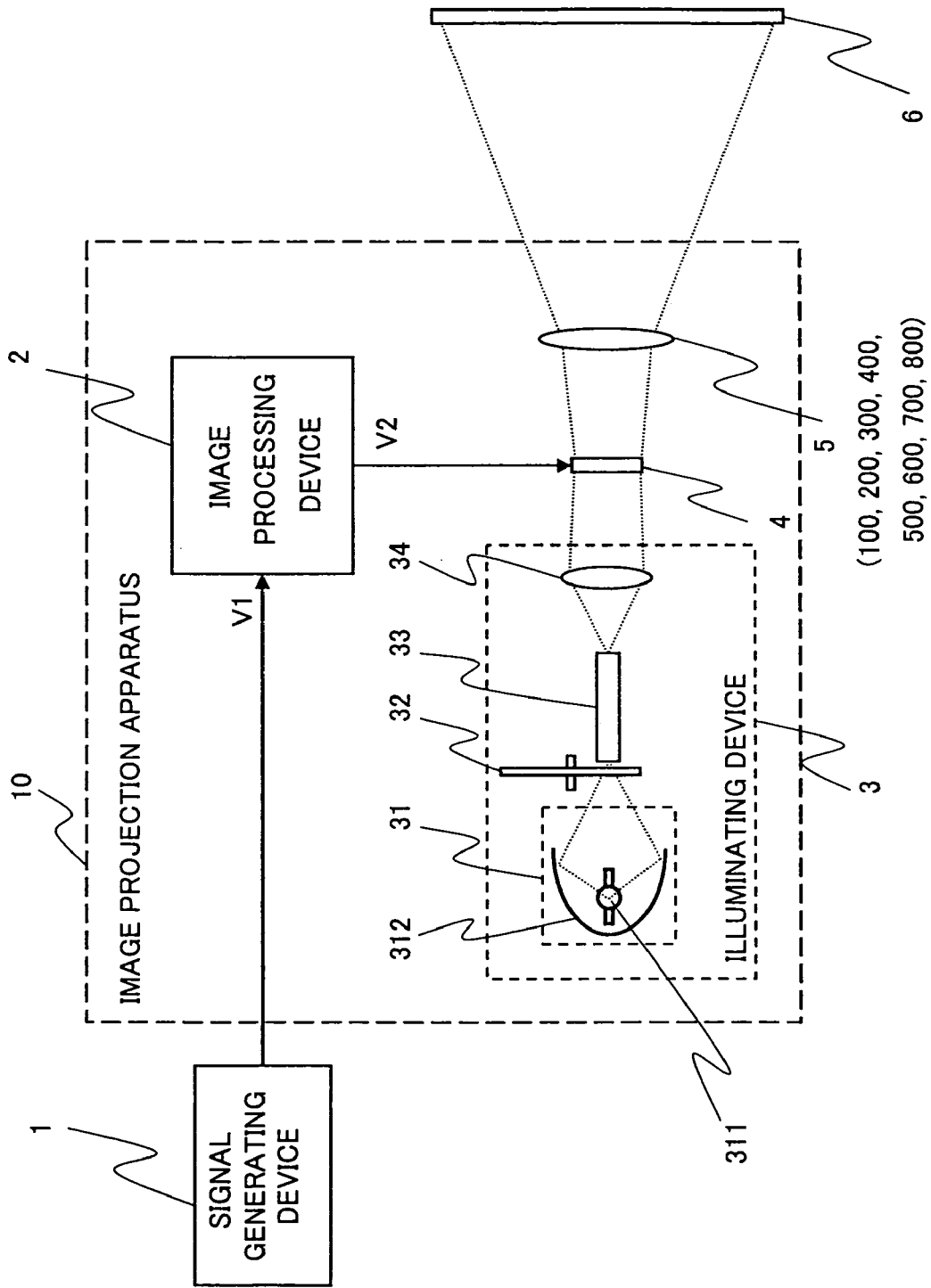
FIG. 2 is a block diagram schematically showing a structure of an image projection apparatus according to the first to eighth embodiments of the present invention.

FIG. 2 is a block diagram schematically showing a structure of an image projection apparatus 10 according to the first embodiment. Referring to FIG. 2, an image projection apparatus 10 includes an image processing device 2 receiving an input video signal V1 supplied from a signal generating device 1 and image-processing the received input video signal V1 to generate an compensated video signal V2. The image projection apparatus 10 also includes an illuminating device 3 sequentially emitting a red light, a green light, and a blue light, as an illuminating light, and a light valve 4 having a plurality of fixed pixels arranged two-dimensionally with a predetermined fixed-pixel pitch and receiving the compensated video signal V2. The plurality of fixed pixels modulates the illuminating light to sequentially produce a red image light from the red light, a green image light from the green light, and a blue image light from the blue light in accordance with the received compensated video signal V2. The image projection apparatus 10 further includes a projection optical system 5 sequentially receiving the red image light, the green image light, and the blue image light, and magnifying and projecting the red image light, the green image light, and the blue image light on a screen 6 to display a color image on the screen 6. The image processing device 2 controls the light valve 4 by supplying the compensated video signal V2 to the light valve 4. Furthermore, the signal generating device 1 disposed outside the image projection apparatus 10 generates the input video signal V1 containing the color image information to be displayed and outputs it to the image processing device 2.

Figure 1:
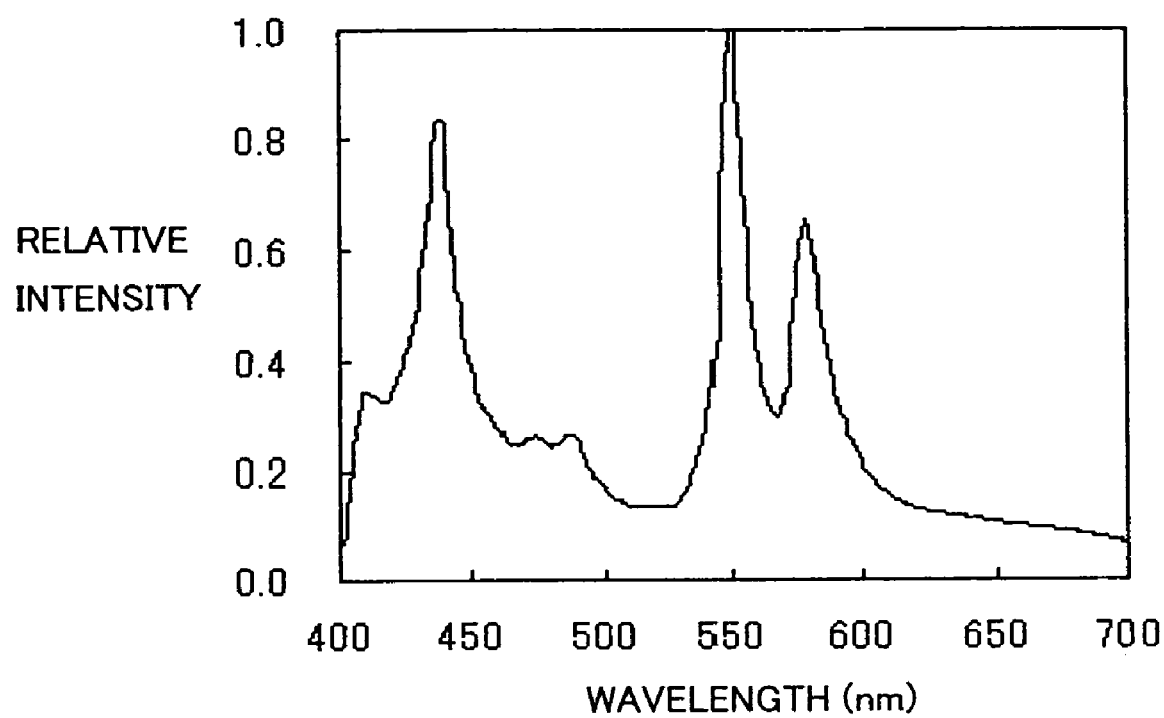
FIG. 1 is a diagram showing an example of a spectral radiance spectrum of a super high pressure mercury lamp.

Referring to FIG. 2, the illuminating device 3 includes a light source 31 generating the illuminating light, which includes a blue light having an emission-line spectrum in a blue wavelength range, a green light having an emission-line spectrum in a green wavelength range, and a red light having a continuous spectrum in a red wavelength range. The illuminating device 3 also includes a color wheel 32, a light uniforming element 33, and an illuminating optical system 34. The light source 31 consists of, for example, a super high pressure mercury lamp unit, which includes a light emitting part 311 emitting a white light and a reflector 312 reflecting and converging the white light emitted from the light emitting part 311 toward the color wheel 32. An example of a spectral radiance spectrum of the super high pressure mercury lamp is shown in FIG. 1.

Figure 3:
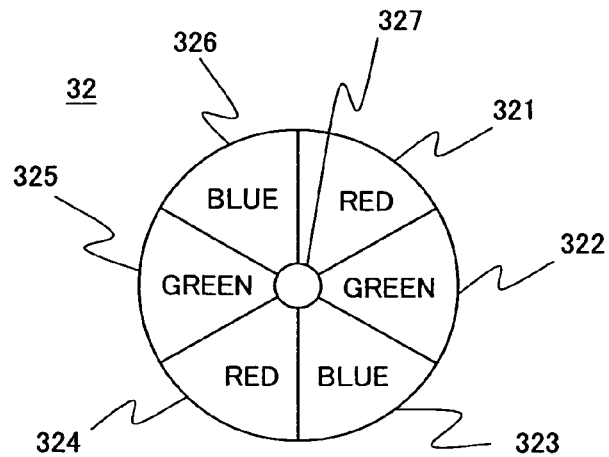
FIG. 3 is front view showing an example of a color wheel in an illuminating device of the image projection apparatus.

FIG. 3 is front view showing an example of a color wheel 32 shown in FIG. 2. Referring to FIG. 3, the color wheel 32 includes a transparent circular glass plate and radially segmented red color filters 321 and 324, green color filters 322 and 325, and blue color filters 323 and 326. The center of the color wheel 32 is supported by a rotary shaft 327. The rotary shaft 327 is rotated in synchronization with the video signal at a desired rotation speed by a driving unit (not shown) such as a motor, to rotate the color wheel 32. The white light emitted from the light source 31 passes through the rotating color wheel 32, thereby generating red, green, and blue primary color lights in a time sharing (field sequential) manner. Therefore, a color image can be displayed on the screen 6 using a single light valve. A color image display method using a single light valve is also referred to as a single-plate method.

The light uniforming element 33 shown in FIG. 2 consists of, for example, a light pipe including a rectangular pipe and a reflecting surface disposed on an inner surface of it, and propagate the input light by multiple reflections. Further, the light uniforming element 33 may be a rod integrator and the like consisting of a glass rectangular member and propagating the input light by total reflections. The light input to the light uniforming element 33 is made uniform in light intensity distribution and the cross sectional shape of the light is converted from a circular shape to a rectangular shape that is an approximately similar shape to the light valve.

The illuminating optical system 34 includes a lens (or lenses) or a mirror (or mirrors) or a combination of them, and applies the light uniformed by the uniforming element 33 to the light valve 4.

The light valve 4 includes a plurality of fixed pixels (not shown in the drawings) arranged two-dimensionally, and spatially modulates the input light in accordance with the received compensated video signal V2 input from the image processing device 2, thereby generating the image lights. The light valve 4 may be, for example, a transmissive liquid crystal panel, a reflective liquid crystal panel, a Digital Micromirror Device (DMD) as a reflective light valve manufactured by Texas Instruments Incorporated, or the like.

The projection optical system 5 includes a lens (or lenses) or a mirror (or mirrors) or a combination of them, and sequentially magnifies and projects the image lights generated by the light valve 4 on the screen 6.

The projected image light is reflected and scattered on the screen 6 (in the case of the front-projection type) or is passed through and scattered on the screen 6 (in the case of the rear-projection type), thereby displaying an image based on the image light so as to enable a viewer to see it. The screen 6 includes, in an order from a side of the light input, a Fresnel lens (not shown in the drawings) deflecting the input light to a viewer, and a lenticular lens (not shown in the drawings) increasing an angle of view by scattering the input light in a horizontal direction and/or a vertical direction.

Figure 4A:
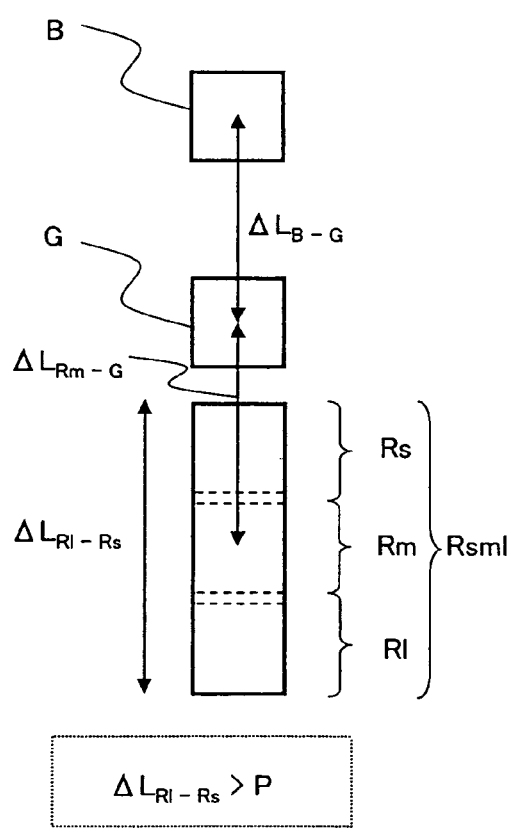
FIGS. 4A and 4B are diagrams for describing the principle of compensation of the magnification chromatic aberration of the red light by the projection optical system.
Figure 4B:
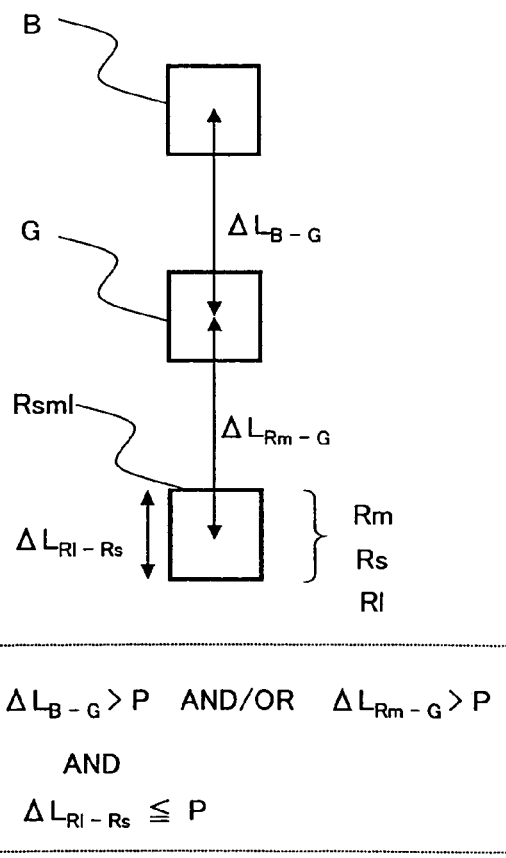

FIGS. 4A and 4B are diagrams for describing the principle of compensation of the magnification chromatic aberration of the red light by the projection optical system 5. FIG. 4A shows deviations on the light valve corresponding to deviations of red, blue, green lights on the screen resulting from the magnification chromatic aberration of a projection optical system of conventional type, while FIG. 4B shows deviations on the light valve 4 corresponding to deviations of red, blue, green lights on the screen 6 resulting from the magnification chromatic aberration of a projection optical system 5 of the first to eighth embodiments when the light source of the projection optical system is a super high pressure mercury lamp.

Referring to FIGS. 4A and 4B, when the illuminating light emitted from the illuminating device 3 includes a blue light having an emission-line spectrum in a blue wavelength range, a green light having an emission-line spectrum in a green wavelength range, and a red light having a continuous spectrum in a red wavelength range, there are positional deviations on the screen 6 resulting from the magnification chromatic aberration of the projection optical system 5 between the blue light (B) and the green light (G) and between the red light (Rsml) and the green light (G). The positional deviations on the screen 6 can be converted to positional deviations $\Delta L_{Rm-G}$ and $\Delta L_{B-G}$ on the light valve 4 shown in FIGS. 4A and 4B, for example, by dividing the positional deviations on the screen 6 by a magnification (M) of the projection optical system 5. For this reason, the positional deviations on the light valve 4 are equivalent to the positional deviations on the screen 6.

The projection optical system 5 of the first embodiment is formed in such a way that at least one of a first deviation $\Delta L_{Rm-G}$ as a length on the light valve 4 corresponding to an amount of the magnification chromatic aberration of a light (Rm) having a central wavelength of the red light (Rsml) relative to the green light (G) and a second deviation $\Delta L_{B-G}$ as a length on the light valve 4 corresponding to an amount $\Delta L_{B-G}$ of the magnification chromatic aberration of the blue light (B) relative to the green light (G) is larger than a fixed-pixel pitch P between adjacent fixed pixels of the light valve 4, and a third deviation $\Delta L_{Rl-Rs}$ as a length on the light valve 4 corresponding to an amount of the magnification chromatic aberration of a light (Rl) having a maximum wavelength of the red-light (Rsml) relative to a light (Rs) having a minimum wavelength of the red light (Rsml) is not larger than the fixed-pixel pitch P. Although the conventional projection optical system induces the magnification chromatic aberration as shown in FIG. 4A, the projection optical system 5 according to any of the first to eighth embodiments induces the magnification chromatic aberration, the red light (Rsml) of which is optically compensated, as shown in FIG. 4B.

Figure 5:
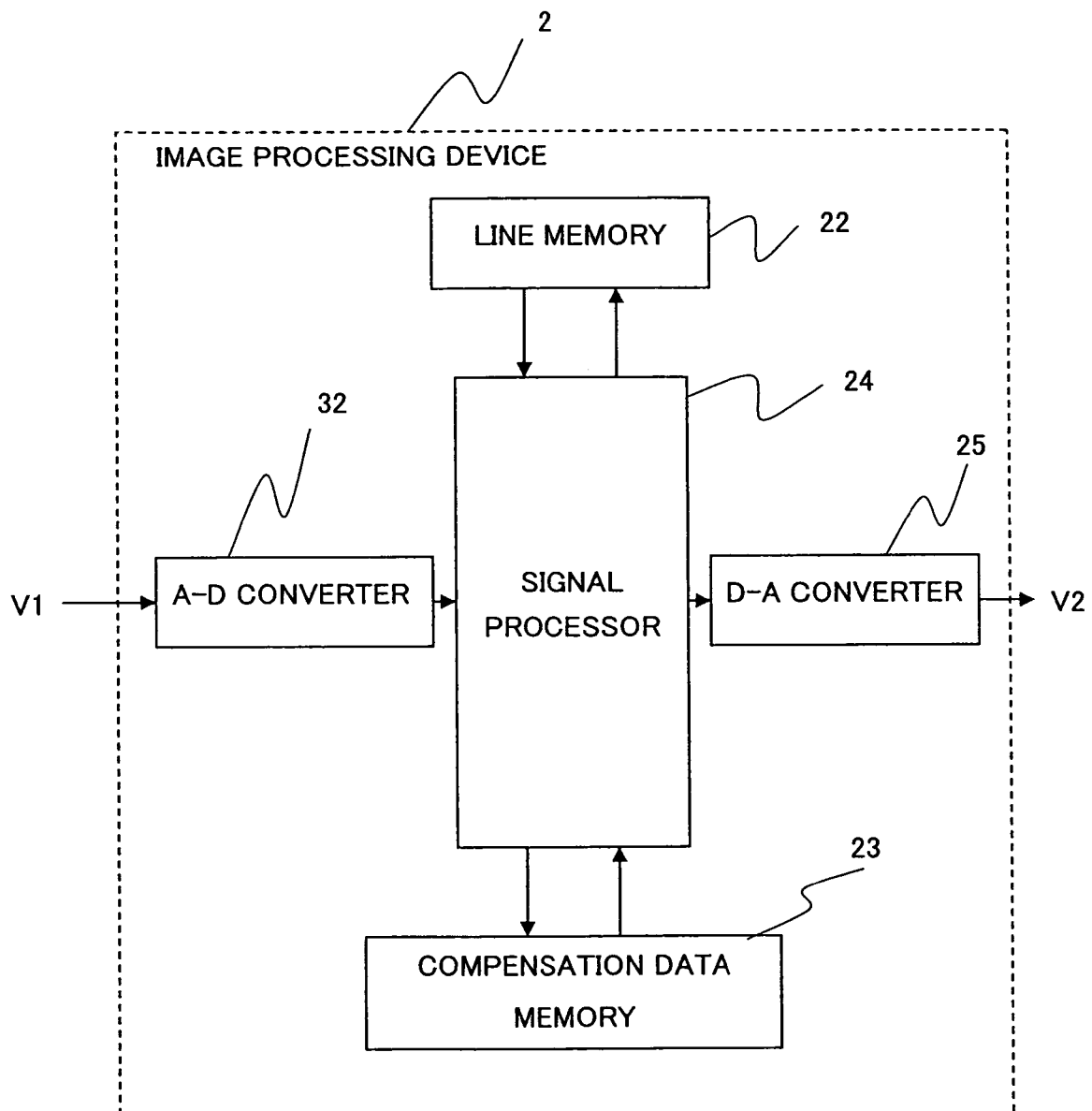
FIG. 5 is a block diagram schematically showing a structure of the image processing device shown in FIG. 2.

FIG. 5 is a block diagram schematically showing a structure of the image processing device 2 shown in FIG. 2. Referring to FIG. 5, the image processing device 2 includes an A-D converter 21, a line memory 22, a compensation data memory 23 for storing compensation data, a signal processor 24, and a D-A converter 25. The compensation data memory 23 stores in advance the compensation data determined in accordance with a structure of the projection optical system 5. The stored compensation data are, for example, compensation amounts of pixel display positions for each pixel and for each of red, green, and blue colors. The stored compensation data may be compensation amounts of pixel display positions for each pixel group including a plurality of pixels, the pixel groups being determined by dividing the pixels of the light valve into a plurality of sections. The compensation data are obtained, for example, by calculation in accordance with the structure of the projection optical system 5 and, in case of necessity, are adjusted in accordance with a result of actual measurement of the optical properties.

The input video signal V1 output from the signal generating device 1 (FIG. 2) includes, for example, pixel display position information, luminance information, chromatic information, and other information for each color and each pixel. The compensation data memory 23 may store compensation amounts of pixel display positions for each color and each pixel in accordance with both the distortion and the magnification chromatic aberration of the projection optical system 5. The compensation amounts of pixel display positions for each color and for each pixel are used for canceling out the distortion and the magnification chromatic aberration of the light valve 4.

The A-D converter 21 receives the input video signal V1 from the signal generating device 1 and converts it to a digital video signal. The signal processor 24 receives the digital video signal from the A-D converter 21, and the line memory 22 stores the digital video signal for each of red, green, and blue colors. The signal processor 24 compensates the pixel display positions (the digital video signal) stored in the line memory 22 for each pixel and each color by using compensation data (e.g., compensation amounts of pixel display positions) for each pixel and each color to generate the compensated pixel display position information (compensated digital video signal). The compensated digital video signal is converted to the compensated video signal V2 by the D-A converter 25 to be output to the light valve 4.

The image projection apparatus according to the first embodiment allows the magnification chromatic aberration of the projection optical system 5 to some extent, and cancels out the magnification chromatic aberration of the projection optical system 5 by image processing, thereby displaying a color image with little color deviation on the screen 6. A description about this point will be made below.

FIGS. 6A to 6C, FIGS. 7A to 7C, and FIGS. 8A to 8C are diagrams for describing the principle of compensation of the magnification chromatic aberration by image processing. FIG. 6A, FIG. 7A, and FIG. 8A show deviations on the light valve 4 corresponding to deviations of lights on the screen 6 resulting from the magnification chromatic aberration of the projection optical system 5. FIG. 6B, FIG. 7B, and FIG. 8B show a distance and a direction of compensation of the pixel position of each color when the input video signal V1 is compensated by the signal processing device 2. FIG. 6C, FIG. 7C, and FIG. 8C show a displayed pixel on the screen 6 or a pixel position on the light valve 4 corresponding to the displayed pixel on the screen 6. When the image processing device 2 compensates the magnification chromatic aberration of the projection optical system 5, the pixel display position information for each pixel is compensated.

As shown in FIG. 6A, for example, in the case where a position of a blue pixel (B) is deviated from a position of a green pixel (G) in a direction of +Y by a length of 1 pixel due to the magnification chromatic aberration of the blue light relative to the green light (also referred to as "blue magnification chromatic aberration") and a position of a red pixel (R) is deviated from a position of a green pixel (G) in a direction of −Y by a length of 1 pixel due to the magnification chromatic aberration of a light (Rm) having a central wavelength of the red light relative to the green light (also referred to as "red magnification chromatic aberration"), the image processing device 2 generates the compensated video signal V2 that has been compensated in such a way that a pixel display position of the blue pixel (B) of the input video signal is moved in a direction of −Y by a length of 1 pixel and a pixel display position of the red pixel (R) of the input video signal is moved in a direction of +Y by a length of 1 pixel, as shown in FIG. 6B. By this compensation, a white pixel (W) without color deviation can be displayed on the screen 6, as shown in FIG. 6C.

Further, as shown in FIG. 7A, for example, in the case where a position of a blue pixel (B) is deviated from a position of a green pixel (G) in a direction of +Y by a length of N pixels, where N is an integer not less than 1, due to the magnification chromatic aberration of the blue light relative to the green light and a position of a red pixel (Rm) is deviated from a position of the green pixel (G) in a direction of +Y by a length of N pixels due to the magnification chromatic aberration of the blue light relative to the green light (blue magnification chromatic aberration), the image processing device 2 generates the compensated video signal V2 that has been compensated in such a way that a pixel display position of a blue pixel (B) of the input video signal is moved in a direction of −Y by a length of N pixels and a pixel display position of the red pixel (Rm) of the input video signal is moved in a direction of +Y by a length of N pixels, as shown in FIG. 7B. By this compensation, a white pixel (W) without color deviation can be displayed on the screen 6, as shown in FIG. 7C.

Furthermore, as shown in FIG. 8A, for example, in the case where a position of a blue pixel (B) is deviated from a position of a green pixel (G) in a direction of +Y by a length of 0.5 pixels due to the magnification chromatic aberration of the blue light relative to the green light and a position of a red pixel (Rm) is deviated from a position of the green pixel (G) in a direction of +Y by a length of 0.5 pixels due to the magnification chromatic aberration of the blue light relative to the green light (blue magnification chromatic aberration), the image processing device 2 generates the compensated video signal V2 that has been compensated in such a way that a pixel display position of a red pixel (Rm) of the input video signal is not moved and a pixel display position of a blue pixel (B) of the input video signal is moved in a direction of −Y by a length of 1 pixel, as shown in FIG. 8B. By this compensation, a color deviation between the blue pixel. (B) and the red pixel (Rm) on the screen can be zero and a color deviation between the red and blue pixels (Rm) and (B) and the green pixel (G) on the screen can be decreased to −0.5 pixels, as shown in FIG. 8C.

By compensating the pixel display position information by the image processing device 2 as described above, irrespective of an amount of the magnification chromatic aberration of the projection optical system 5, an amount of the positional deviation on the screen 6 can be reduced to 0.5 pixels or less. In FIGS. 6A to 6C, FIGS. 7A to 7C, and FIGS. 8A to 8C, a direction of Y is, for example, a vertical direction on the screen 6. The similar compensation can be implemented in a horizontal direction (i.e., a direction of X) on the screen 6.

Further, if there is the distortion by the projection optical system 5 (i.e., there is pincushion distortion or barrel distortion in the image displayed on the screen 6), the distortion is corrected for green pixels. The image processing device 2 generates a compensated video signal V2 in such a way that a positional deviation of the pixel display position of the green pixel is cancelled out by compensating the pixel display position information so as to cancel the positional deviation by an amount of the positional deviation due to distortion. As has been described using FIGS. 6A to 6C, FIGS. 7A to 7C, and FIGS. 8A to 8C, pixel display position information of the green pixel that has been compensated so as to cancel the distortion is compensated relative to the pixel display position information of the compensated green pixel. By this compensation, image distortion appearing on the screen 6 can be eliminated.

If the magnification chromatic aberration of the projection optical system 5 is large, a capacity of the line memory 22 for storing the pixel data of the input video signal to be compensated needs to be increased, thereby resulting in an increase in cost of the image processing device 2.

On the other hand, if the projection optical system 5 includes an expensive anomalous dispersion glass for reducing the amount of the magnification chromatic aberration (i.e., the deviation on the light valve 4 corresponding to the amount of the magnification chromatic aberration) at a wide angle of view below a length of 1 pixel, the projection optical system 5 becomes expensive.

Therefore, it is preferable that in order to suppress an increase in cost of the image processing device 2 and the projection optical system 5 and to implement an image projection apparatus at a reduced cost and a small depth (i.e., a wide angle of view), the projection optical system 5 should adopt a lens of comparatively low-price glass material having similar performance to an anomalous dispersion glass for optically eliminating the magnification chromatic aberration to some extent, and the image processing device 2 should electrically eliminate the remaining magnification chromatic aberration, which is not eliminated optically by the projection optical system 5, by image processing.

The pixel display position information cannot be electrically compensated by image processing so as to eliminate the magnification chromatic aberration of the red light (Rsml in FIG. 4A) and therefore the magnification chromatic aberration of the red light causes a color blur to appear on the screen 6. Accordingly, it is preferable that an amount $\Delta L_{Rm-G}$ of the magnification chromatic aberration of the red light of the projection optical system 5 be suppressed below a length of 1 pixel by the projection optical system 5.

In other words, it is preferable that an amount $\Delta L_{Rm-G}$ of the magnification chromatic aberration of the red light be suppressed on or below a length of 1 pixel by the projection optical system 5, and amounts of the magnification chromatic aberration of the blue light and the red light be suppressed on or below a length of several pixels at most by the projection optical system 5.

As described above, according to the image projection apparatus 100 of the first embodiment, the pixel display position information of the input video signal is image-processed for each color and the compensated video signal V2 that has been compensated in advance is generated, and therefore the magnification chromatic aberration of the projection optical system 5 is required to be decreased to some extent (i.e., is not required to be decreased to a very low level). Therefore, the projection optical system 5 with a wide angle of view and with no anomalous dispersion glass can be implemented, and the image projection apparatus 100 at a reduced cost and a short projection distance lp can be obtained.

FIG. 9A is a diagram showing a numerical example of the projection optical system 5 according to the first embodiment. A reference character Si represents the i-th optical surface of the optical member, and i (i=1, ..., 20) represents a surface number of the i-th optical surface counted from a magnification side (a left side in FIG. 10, i.e., a screen side) to a reduction side (a right side in FIG. 10). A reference character Ri represents a radius of curvature of the optical surface Si. A surface distance Di represents a distance between an apex of the optical surface Si and an apex of the next optical surface Si+1. A unit of the radius of curvature Ri and the surface distance Di is millimeter (mm). A refractive index (nd) and an Abbe number represent a refractive index and an Abbe number of the optical surface Si for d-line (a wavelength of 587.56 nm). Further, asterisk * assigned to the optical surface Si mean aspherical surfaces. Each of the aspherical surfaces S1 and S2 are expressed by the following equations;

$$Z = \frac{(h^2/r)}{1+\sqrt{1-(1+K)\cdot(h^2/r^2)}} + \sum_{j=1} A_j \cdot h^j,$$

and $$h = \sqrt{X^2 + Y^2},$$

where Z represents a position in an optical axis direction in a (X, Y, Z) rectangular coordinates, r represents a paraxial radius of curvature, K represents a conical constant, $A_1$, $A_2$, ... (i.e., $A_j$) represent a first order, a second order, ... (a j-th order) aspherical coefficients, where j is an integer not less than 1. Further, the aspherical data (aspherical coefficients $A_1$, $A_2$, ... and conical constant K) are shown in FIG. 9B.

Figure 10:
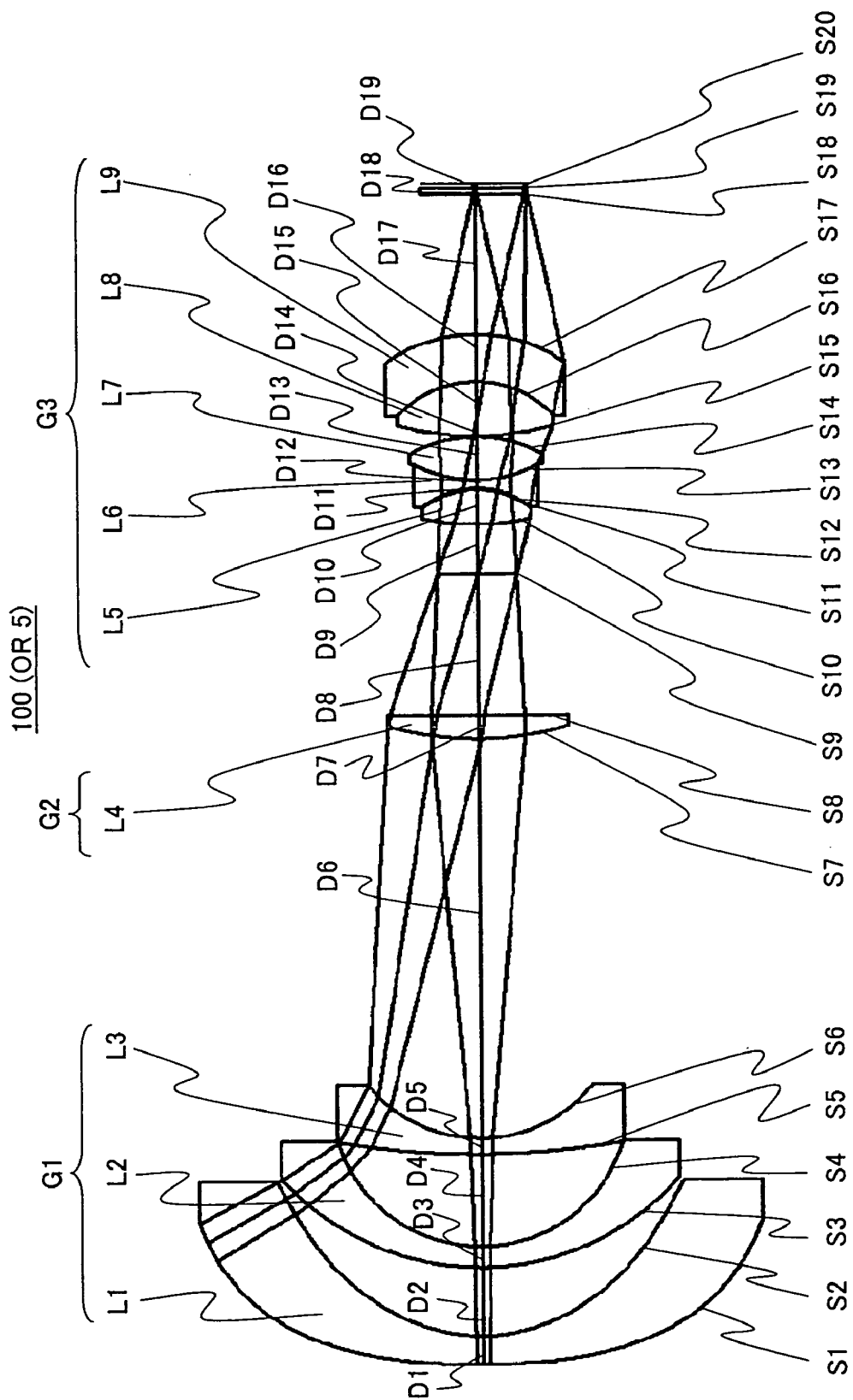
FIG. 10 is a diagram schematically showing a structure of the projection optical system according to the first embodiment.

FIG. 10 is a diagram schematically showing a structure of the projection optical system 100 corresponding to the numerical example shown in FIGS. 9A and 9B. In these figures, S1, S2, ..., S20 (i.e., Si (i=1, 2, ..., 20)) represent surfaces of optical members respectively, i represents the surface number, D1, D2, ..., D19 represent the surface distances respectively, L1, L2, ..., L9 represent the lenses of the first, second, and third groups G1-G3 in an order from a magnification side respectively, and S9 represents an aperture stop. Furthermore, S20 represents a surface of the light valve 4 (i.e., an image forming surface), and S18 and S19 represent both surfaces of a glass plate (i.e., a flat plate) disposed on the front side (screen side) of the light valve 4.

In the first embodiment, the projection optical system 100 has the following specific properties with respect to d-line. A focal length f is 6.327 mm, a lateral magnification M is −1/103.05, an F-number Fno is 2.4, an entire angle of view 2ω of the projection light is 115 degrees, and a projection distance lp (i.e., a distance between a surface of the screen 6 and the surface S1) is 587.51 mm.

The projection optical system 100 according to the first embodiment includes, in an order from the magnification side, the first group G1 having negative power (i.e., negative refractive power), the second group G2 having positive power (i.e., positive refractive power), the aperture stop S9, and the third group G3 having positive power (i.e., positive refractive power), and is retrofocus type.

The retrofocus type projection optical system 100 is suitable for implementing a wide angle of view and long back focal length.

It is known that in a retrofocus type optical system, the positive power and the negative power tend to be asymmetrical with respect to the aperture stop S9, and therefore the magnification chromatic aberration and the distortion are hardly to be compensated.

The image projection apparatus according to the first embodiment makes good use of the retrofocus type projection optical system 100 suitable for a wide angle of view, and compensates by image processing the magnification chromatic aberration and the distortion generally as an inevitable consequence of the retrofocus type projection optical system.

Further, it is possible to compensate (or adjust) optical performance relating to only a geometric shape of a light image such as the magnification chromatic aberration or the distortion by image processing. However, since it is difficult to compensate (or adjust) optical performance relating to sharpness of a light image such as the spherical aberration or coma aberration or astigmatism by image processing, these need to be compensated optically by the projection optical system 100.

The whole first group G1 has negative power and has a function of making an angle of view (when viewed from the reduction side) much wider.

The whole second group G2 has positive power and has a function of making the light advancing from the first group G1 approximately parallel.

The whole third group G3 has positive power and has a function of converging the light advancing from the second group G2 on the light valve 4.

The first group G1 includes, in an order from the magnification side, the first lens L1 as a negative meniscus lens that has a convex surface facing the magnification side and has an aspherical shape, the second lens L2 as a negative meniscus lens that has a convex surface facing the magnification side, and the third lens L3 as a negative meniscus lens that has a convex surface facing the magnification side.

The first lens L1 has the highest height of the principal ray in the projection optical system 100, and has an aspherical surface or surfaces in order to make it easy to control astigmatism and/or distortion.

Since the first lens L1 is a large-sized aspherical lens, it is preferable that the first lens L1 be manufactured by plastic molding and its material be acryl, a material called as "ZEONEX" (optical resin manufactured by ZEON CORPORATION), or other material.

When the first lens L1 is manufactured by plastic molding, it is preferable that a difference between a central thickness and a peripheral thickness of the first lens L1 be small from the viewpoint of the fluidity of resin to the metal die and the uniform cooling of resin. In the first embodiment, a ratio of a central thickness to a peripheral thickness in the first lens L1 is 1:3.10.

Since the second lens L2 and the third lens L3 are made of a glass material having a comparatively large refractive index exceeding a value of 1.7, it is possible that a lens having a small radius of curvature can be used as the second and third lenses and occurrence of various aberrations can be suppressed. Furthermore, since a lens having a larger refractive index has stronger refractive power even if the radii of curvature are the same, the number of the lenses of the first group G1 having a large diameter can be reduced, which leads to a reduction in cost.

It is preferable that the first group G1 satisfy the following conditional equation (1).

$$-2.5 < f_1/f < -1.8 \quad (1),$$

where f represents a focal length of the entire system of the projection optical system 100, and $f_1$ represents a focal length of the first group G1.

The conditional equation (1) defines a preferable range of a ratio of the focal length $f_1$ of the first group G1 to the focal length f of the entire system of the projection optical system.

If the ratio $f_1/f$ is lower than a lower limit value of −2.5 in the conditional equation (1), the negative power of the first group G1 becomes too small and it is difficult to obtain a sufficient back focal length and a wide angle of view. Further, at this time, the magnification chromatic aberration of the blue light is too large, and the line memory 22 of the image processing device 2 is required to have a large capacity.

If the ratio $f_1/f$ is higher than a higher limit value of −1.8 in the conditional equation (1), the negative power of the first group G1 becomes too strong. As a result, it is difficult to compensate the aberration such as the astigmatism, which leads to an increase in number of the lenses and an increase in cost of the lenses.

In the first embodiment, the ratio $f_1/f$ is a value of −2.408.

The second group G2 includes the positive lens L4, which has a strong convex surface facing the magnification side.

Figure 11:
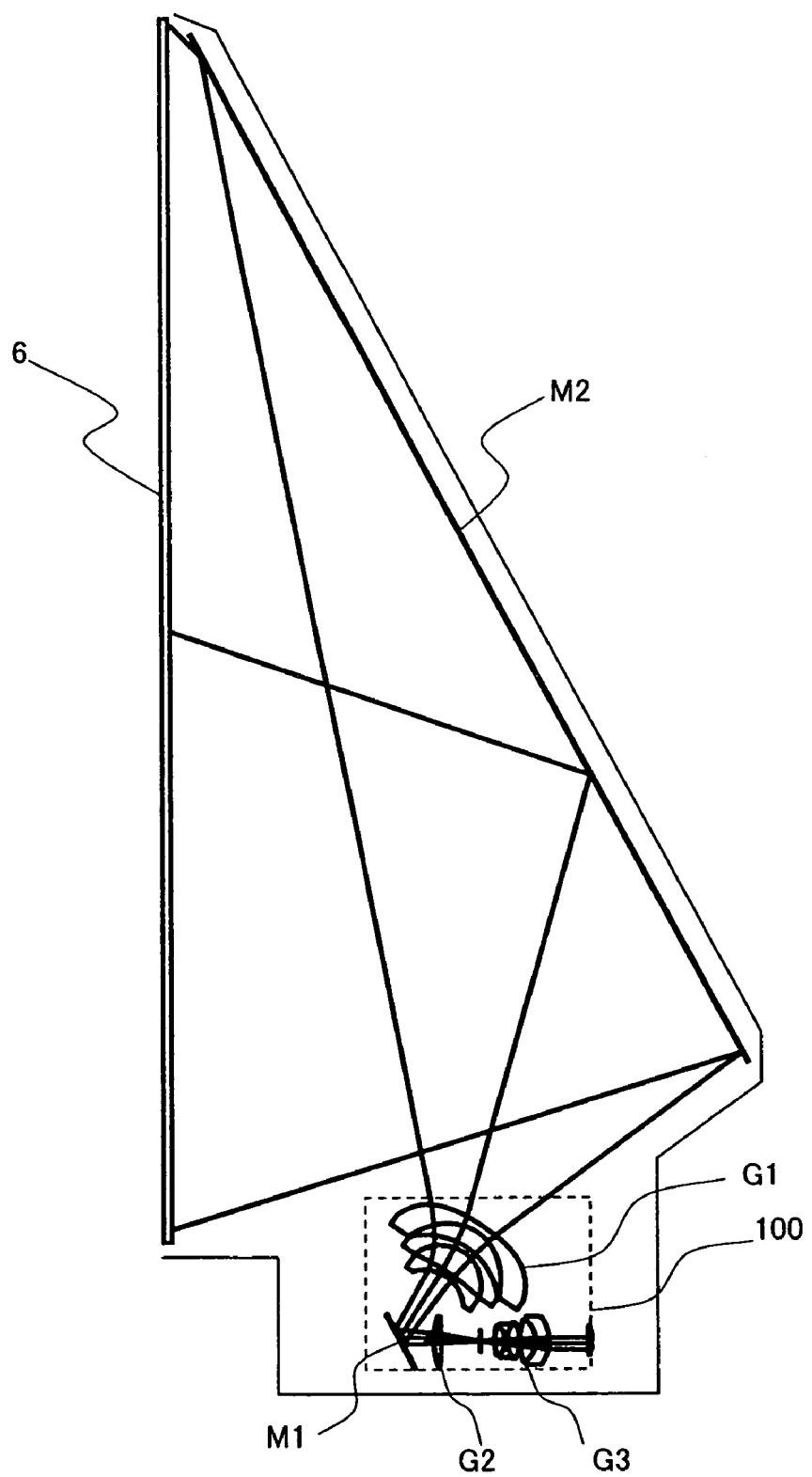
FIG. 11 is a diagram schematically showing an example of a structure of the image projection apparatus according to the first to eighth embodiments.

FIG. 11 is a diagram schematically showing a structure of the image projection apparatus according to the first (or the second to eighth embodiments). FIG. 11 shows the projection optical system 100, in which an optical path is reflected by flat mirrors M1 and M2. As shown in FIG. 11, the flat mirror M1 is disposed on the optical path between the first group G1 and the second group G2, and the flat mirror M2 is disposed on the optical path between the projection optical system 100 and the screen 6, which leads to a slim and compact image projection apparatus. Further, it is preferable that a distance (interval) D6 between the first group G1 and the second group G2 be enough long to dispose the flat mirror M1 between them.

Referring to FIG. 10, when viewed from the reduction side (right side in FIG. 10), the principal ray advancing from the third group G3 to the second group G2 diverges greatly. If a distance between the first group G1 and the second group G2 is large, a diameter of lenses of the first group G1 needs to be large, leading an increase in cost. For this reason, the second lens L2 is designed to have positive power, an angle of the principal ray advancing toward the second group G2 relative to an optical axis is decreased, and a diameter of the lenses of the first group G1 is reduced.

It is preferable that the second group G2 satisfy the following conditional equation (2)

$$10 < f_2/f < 12 \quad (2),$$

where f represents a focal length of an entire system of the projection optical system 100, and $f_2$ represents a focal length of the second group G2 of the projection optical system 100.

The conditional equation (2) defines a preferable range of a ratio of the focal length $f_2$ of the second group G2 to the focal length f of the entire system.

If the ratio $f_2/f$ is lower than a lower limit value of 10 in the conditional equation (2), the positive power of the second group G2 becomes too strong, and therefore the negative power of the first group G1 needs to be increased. As a result, it is difficult to compensate the aberration such as the astigmatism, which leads to an increase in number of the lenses and an increase in cost of the lenses.

If the ratio $f_2/f$ is higher than an upper limit value of 12 in the conditional equation (2), the positive power of the second group G2 becomes too weak, and therefore the negative power of the first group G1 needs to be increased, which leads to an increase in diameters of the lenses of the first group G1 and an increase in cost of the lenses.

In the first embodiment, the ratio $f_2/f$ is a value of 10.675.

The third group G3 includes, in an order from the magnification side, the fifth lens L5 as a positive lens having a strong convex surface facing the reduction side, the sixth lens L6 as a negative lens having a strong concave surface facing the magnification side, the seventh lens L7 as a positive lens having a strong convex surface facing the magnification side, the eighth lens L8 as a positive lens having a strong convex surface facing the reduction side, and the ninth lens L9 as a negative meniscus lens having a convex surface facing the reduction side.

Each of a set of the sixth lens L6 and the seventh lens L7 and a set of the eighth lens L8 and the ninth lens L9 is a cemented lens including a positive lens with a small refractive index and a large Abbe number and a negative lens with a large refractive index and a small Abbe number, to form an achromatic lens. Since the projection optical system includes at least one achromatic lens, the axial chromatic aberration can be compensated appropriately.

It is preferable that the third group G3 satisfy the following conditional equation (3)

$$5.5 < f_3/f < 6.0 \quad (3),$$

where f represents a focal length of the entire system, and $f_3$ represents a focal length of the third group G3 of the projection optical system.

The conditional equation (3) defines a preferable range of a ratio of the focal length $f_3$ of the third group G3 to the focal length f of the entire system of the projection optical system.

If the ratio $f_3/f$ is lower than a lower limit value of 5.5 in the conditional equation (3), the positive power of the third group G3 becomes too strong and the radii of curvature of the lenses are large. Therefore, various aberrations such as spherical aberration are difficult to be compensated, and sufficient performance is difficult to be obtained because of high eccentricity sensitivity of each lens.

On the other hand, if the ratio $f_3/f$ is higher than an upper limit value of 6.0, the positive power of the third group G3 becomes too weak, which leads to a decrease in telecentric performance on a side of the light valve and an increase in a whole length of the optical lens system. Therefore, an increased size of the image projection apparatus is required.

In the first embodiment, the ratio $f_3/f$ is a value of 5.706.

It is preferable that at least one of the positive lenses of the third group G3 satisfy the following conditional equation (4)

$$60 < \nu_d < 80 \quad (4),$$

where $\nu_d$ represents an Abbe number for d-line of each of the positive lenses of the third group G3.

The conditional equation (4) defines a preferable range of Abbe numbers of the positive lenses of the third group G3 of the projection-optical system.

If the Abbe number $\nu_d$ is lower than a lower limit value of 60 in the conditional equation (4), an amount of the magnification chromatic aberration at a wide angle of view becomes too large, which leads to an increase in required memory capacity of the line memory 22 in the image processing device 2 and a color blur in a red image.

A glass, an Abbe number $\nu_d$ of which exceeds the upper limit value of 80 in the conditional equation (4), belongs to anomalous dispersion glass, which leads to an increase in lens cost.

In other words, in order to reduce the magnification chromatic aberration sufficiently (e.g., within a length of 1 pixel), it is preferable that an Abbe number of the positive lens in the third group G3 be as large as possible. However, since the glass material having the Abbe number $v_d$ exceeding a value of 80 belongs to anomalous dispersion glass, a cost of the projection optical system increases. If the glass material satisfying the conditional equation (4) is used as the positive lens of the third group G3, the magnification chromatic aberration can be compensated appropriately at a reduced cost.

In the first embodiment, the Abbe number $v_d$ is a value of 70.4.

Figure 12:
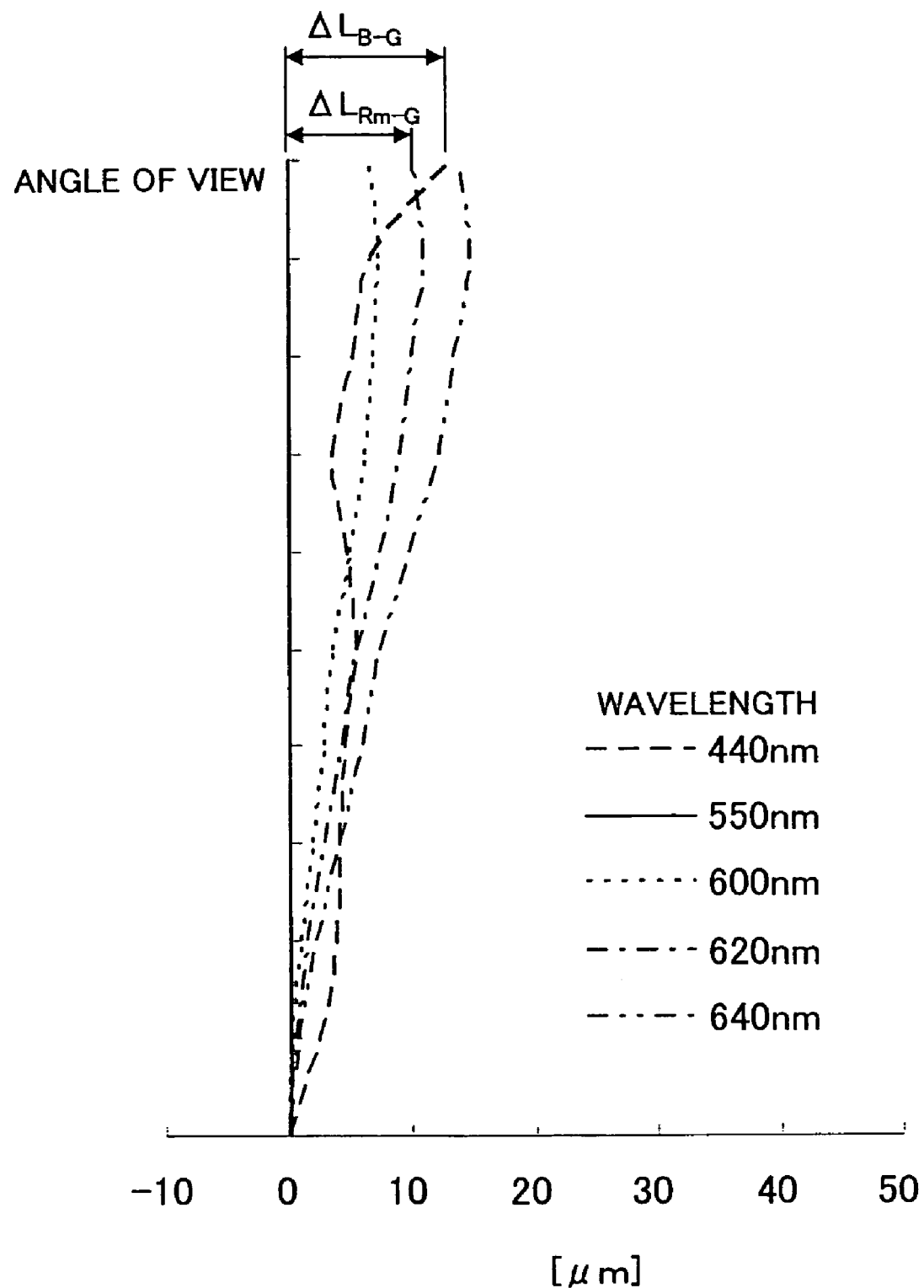
FIG. 12 is a diagram showing deviations on the light valve corresponding to amounts of the magnification chromatic aberrations optically compensated by the projection optical system according to the first embodiment.

FIG. 12 is a diagram showing deviations on the light valve 4 corresponding to amounts of the magnification chromatic aberrations optically compensated by the projection optical system 100 according to the first embodiment. In FIG. 12, a vertical axis indicates an angle of view, and a horizontal axis indicates a deviation on the light valve 4 corresponding to an amount of the magnification chromatic aberration of the projection optical system 100 (i.e., a length on the light valve 4 corresponding to a deviation on the screen 6 resulting from the magnification chromatic aberration of the projection optical system 100). FIG. 12 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 12, at the maximum angle of view, an amount $\Delta L_{B-G}$ of magnification chromatic aberration of the blue light (440 nm) relative to the green light (550 nm) is approximately the same as an amount $\Delta L_{Rm-G}$ of the magnification chromatic aberration of the light having a central wavelength (620 nm) of the red light relative to the green light (550 nm). The amount $\Delta L_{B-G}$ of the magnification chromatic aberration is 13.3 μm, and the amount $\Delta L_{Rm-G}$ of the magnification chromatic aberration is 10.4 μm. Furthermore, as can be understood from FIG. 12, at the maximum angle of view, an amount $\Delta L_{Rl-Rs}$ of the magnification chromatic aberration of the light having a maximum wavelength (640 nm) of the red light relative to the light having a minimum wavelength (600 nm) of the red light is 7.4 μm.

In the first embodiment, when the fixed-pixel pitch P of the light valve 4 is a length of 10 μm, the projection optical system satisfies the following conditional equations $\Delta L_{B-G} > P,$ $\Delta L_{Rm-G} > P,$ and $\Delta L_{Rl-Rs} \leq P.$ As described above, in the projection optical system 100 of the first embodiment, the amount $\Delta L_{B-G}$ of the magnification chromatic aberration of the blue light (B) relative to the green light (G) is 13.3 μm, and the amount $\Delta L_{Rm-G}$ of the magnification chromatic aberration of the light (Rm) having a central wavelength of the red light relative to the green light (G) are 10.4 μm. A fixed-pixel pitch P is 10 μm, and an allowable color deviation is a length of 1 pixel or below. Therefore, the image projection apparatus can reduce a color deviation on the screen 6 sufficiently by causing the image processing device 2 to compensate the pixel display position information so as to shift the red pixel by a length of 1 pixel on the screen 6 (which corresponds to 1 fixed-pixel pitch on the light valve 4) and the blue pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 7.4 μm at maximum, which is smaller than the fixed-pixel pitch P, a red color blur becomes insignificant.

As described above, in the image projection apparatus of the first embodiment, since the pixel display position information of the input video signal V1 is image-processed for each color and the compensated video signal V2 that has been compensated in advance is generated, it is not required the projection optical system 100 be formed so as to reduce the magnification chromatic aberration to a very low level. Therefore, the projection optical system 100 with a wide angle of view and with no anomalous dispersion glass can be implemented, and the image projection apparatus at a reduced cost and a short projection distance lp can be obtained.

Further, in the first embodiment, since the image projection apparatus adopts the optical projection system 100 that can suppress the amount $\Delta L_{Rl-Rs}$ of the magnification chromatic aberration within the red light to a length within 1 fixed-pixel pitch, an image with little color blur can be displayed on the screen 6.

Furthermore, in the first embodiment, since the projection optical system 100 optically compensates the amount $\Delta L_{B-G}$ of the magnification chromatic aberration of the blue light relative to the green light sufficiently and the amount $\Delta L_{Rm-G}$ of the magnification chromatic aberration of the red light relative to the green light within a length of several pixels, the image processing device 2 may compensates the pixel display position information of the red image and the blue image by image-processing. As a result, the image processing can be simplified and a memory capacity of the line memory 22 of the image processing device 2 can be reduced, and a color blur on the screen can be reduced.

Second Embodiment

An image projection apparatus according to the second embodiment of the present invention will be described below.

The image projection apparatus according to the second embodiment is different from that of the first embodiment in a point of the structure of the projection optical system 200 and in a point of the compensation data determined in accordance with the structure of the projection optical system 200 and stored in the compensation data memory 23 of the image processing device 2.

FIG. 13A is a diagram showing a numerical example of the projection optical system in the image projection apparatus according to the second embodiment. The definitions of the surface, the surface number, the radius of curvature, the surface distance, the refractive index, the Abbe number, and the aspherical surface (asterisk *) are similar to those of the first embodiment. Further, FIG. 13B is a diagram showing aspherical data including a conical constant K and aspherical coefficients Aj of the optical surfaces S1 and S2 of the projection optical system in the image projection apparatus according to the second embodiment.

Figure 14:
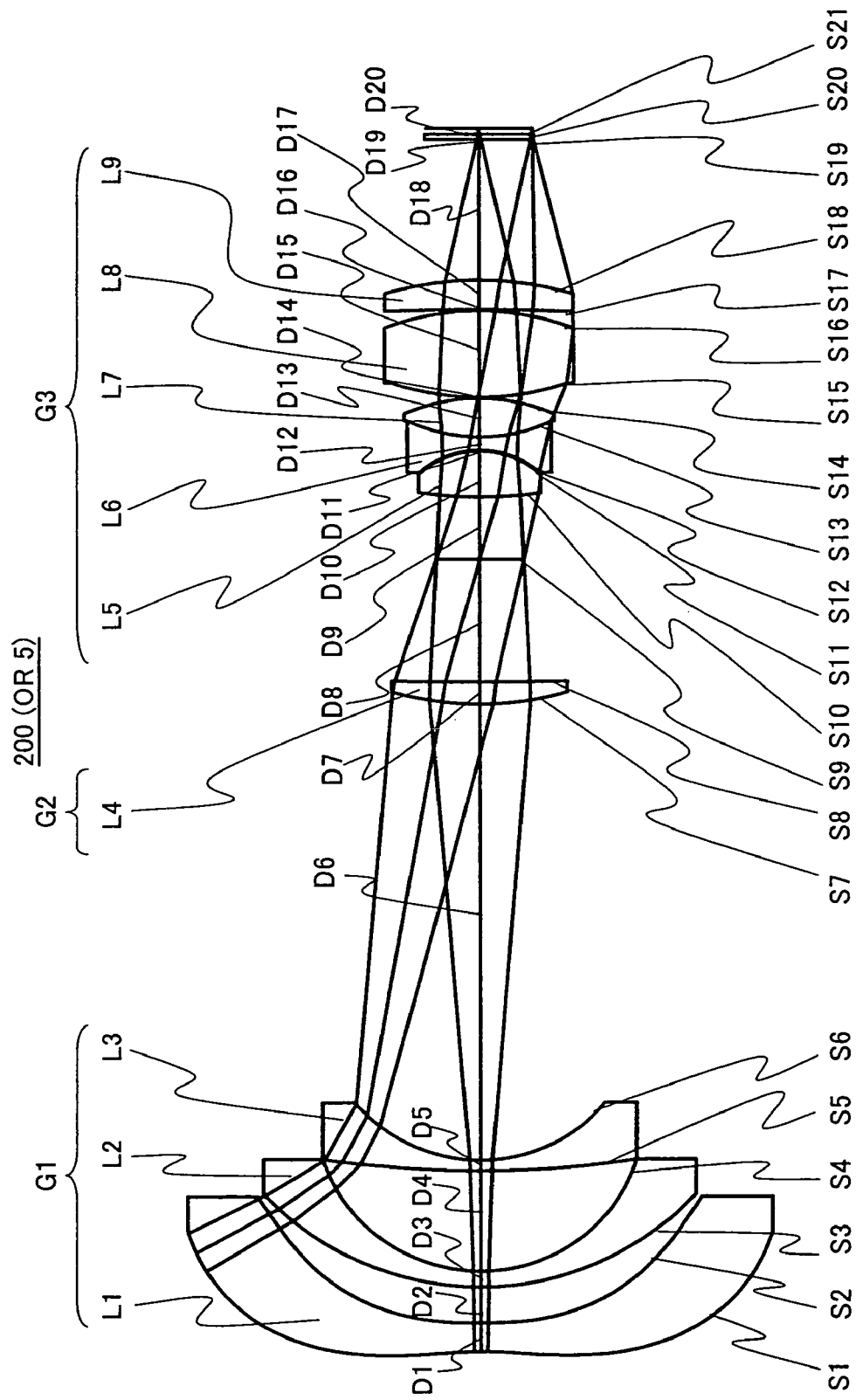
FIG. 14 is a diagram schematically showing a structure of the projection optical system according to the second embodiment.

FIG. 14 is a diagram schematically showing a structure of the projection optical system 200 corresponding to the numerical example shown in FIGS. 13A and 13B. In these figures, S1, S2, ..., S21 (i.e., Si) represent surfaces of optical members respectively, i (i=1, 2, ..., 21) represents the surface number, D1, D2, ..., D20 represent the surface distances respectively, L1, L2, ..., L9 represent the lenses of the first, second, and third groups G1-G3 in an order from a magnification side respectively, and S9 represents an aperture stop.

Furthermore, S21 represents a surface of the light valve 4 (i.e., an image forming surface), and S19 and S20 represent both surfaces of a glass plate (i.e., a flat plate) disposed on the front side (screen side) of the light valve 4.

In the second embodiment, the projection optical system 200 has the following specific properties with respect to d-line. A focal length f is 6.470 mm, a lateral magnification M is −1/103.05, an F-number Fno is 2.4, an entire angle of view 2ω of the projection light is 115 degrees, and a projection distance lp (a distance between a surface of the screen 6 and the surface S1) is 592.25 mm.

The projection optical system 200 according to the second embodiment includes, in an order from the magnification side (a left side in FIG. 14), the first group G1 having negative power, the second group G2 having positive power, the aperture stop S9, and the third group G3 having positive power, and is retrofocus type.

The whole first group G1 has negative power and has a function of making an angle of view (when viewed from the reduction side) much wider.

The whole second group G2 has positive power and has a function of making the light advancing from the first group G1 approximately parallel.

The whole third group G3 has positive power and has a function of converging the light advancing from the second group G2 on the light valve 4.

The first group G1 includes, in an order from the magnification side, the first lens L1 as a negative meniscus lens that has a convex surface facing the magnification side and has an aspherical shape, the second lens L2 as a negative meniscus lens that has a convex surface facing the magnification side, and the third lens L3 as a negative meniscus lens that has a convex surface facing the magnification side.

The first lens L1 has the highest height of the principal ray in the projection optical system 200, and has an aspherical surface or surfaces in order to make it easy to control astigmatism and/or distortion.

Since the first lens L1 is a large-sized aspherical lens, it is preferable that the first lens L1 be manufactured by plastic molding and its material be acryl, a material called as "ZEONEX" (optical resin manufactured by ZEON CORPORATION), or other material.

When the first lens L1 is manufactured by plastic molding, it is preferable that a difference between a central thickness and a peripheral thickness of the first lens L1 be small from the viewpoint of the fluidity of resin to the metal die and the uniform cooling of resin. In the second embodiment, a ratio of the central thickness to the peripheral thickness in the first lens L1 is 1:2.77.

Since the second lens L2 and the third lens L3 are made of a glass material having a comparatively large refractive index exceeding a value of 1.7, it is possible that a lens having a small radius of curvature can be used as the second and third lenses and occurrence of various aberrations can be suppressed. Furthermore, since a lens having a larger refractive index has stronger refractive power even if the radii of curvature are the same, the number of the lenses of the first group G1 having a large diameter can be reduced, which leads to a reduction in cost.

It is preferable that the first group G1 satisfy the following conditional equation (1)

$$-2.5 < f_1/f < -1.8 \quad (1),$$

where f represents a focal length of an entire system of the projection optical system 200, and $f_1$ represents a focal length of the first group G1.

The conditional equation (1) defines a preferable range of a ratio of the focal length $f_1$ of the first group G1 to the focal length f of the entire system of the projection optical system.

If the ratio $f_1/f$ is lower than a lower limit value of −2.5 in the conditional equation (1), the negative power of the first group G1 becomes too small and it is difficult to obtain a sufficient back focal length and a wide angle of view. Further, at this time, the magnification chromatic aberration of the blue light is too large, and the line memory 22 of the image processing device 2 is required to have a large capacity.

If the ratio $f_1/f$ is higher than an upper limit value of −1.8, the positive power of the first group G1 becomes too strong, and therefore it becomes difficult to compensate an aberration such as astigmatism, which leads to an increase in number of the lenses of the first group G1 and an increase in lens cost.

In the second embodiment, the ratio $f_1/f$ is a value of −2.162.

The second group G2 includes the fourth lens L4 having a convex surface facing a side of magnification side, convex surface and is a positive meniscus lens.

Referring to FIG. 14, when viewed from the reduction side (right side in FIG. 14), the principal ray advancing from the third group G3 to the second group G2 diverges greatly. If a distance between the first group G1 and the second group G2 is large, a diameter of lenses of the first group G1 needs to be large, leading an increase in cost. For this reason, the second lens L2 is designed to have positive power, an angle of the principal ray advancing toward the second group G2 relative to an optical axis is decreased, and a diameter of the lenses of the first group G1 is reduced.

It is preferable that the second group G2 satisfy the following conditional equation (2):

$$10 < f_2/f < 12 \quad (2),$$

where f represents a focal length of an entire system of the projection optical system 200, and $f_2$ represents a focal length of the second group G2 of the projection optical system 200.

The conditional equation (2) defines a preferable range of a ratio of the focal length $f_2$ of the second group G2 to the focal length f of the entire system.

If the ratio $f_2/f$ is lower than a lower limit value of 10 in the conditional equation (2), the positive power of the second group G2 becomes too strong, and therefore the negative power of the first group G1 needs to be increased. As a result, it is difficult to compensate the aberration such as the astigmatism, which leads to an increase in number of the lenses and an increase in cost of the lenses.

If the ratio $f_2/f$ is higher than an upper limit value of 12 in the conditional equation (2), the positive power of the second group G2 becomes too weak, and therefore the negative power of the first group G1 needs to be increased, which leads to an increase in diameters of the lenses of the first group G1 and an increase in lens cost.

In the second embodiment, the ratio $f_2/f$ is a value of 11.279.

The third group G3 includes, in an order from the magnification side, the fifth lens L5 as a positive lens having a strong convex surface facing the reduction side, the sixth lens L6 as a negative lens having a strong concave surface facing the magnification side, the seventh lens L7 as a positive lens having a strong convex surface facing the magnification side, the eighth lens L8 as a positive lens having a strong convex surface facing the reduction side, and the ninth lens L9 as a positive meniscus lens having a convex surface facing the reduction side.

A set of the sixth lens L6 and the seventh lens L7 is a cemented lens including a positive lens with a small Abbe number and large positive power and a negative lens refractive index with a large refractive index and a small Abbe number, to form an achromatic lens. Since the projection optical system includes at least one achromatic lens, the axial chromatic aberration can be compensated appropriately.

It is preferable that the third group G3 satisfy the following conditional equation (3)

$$5.5 < f_3/f < 6.0 \quad (3),$$

where f represents a focal length of an entire system of the projection optical system 200, and $f_3$ represents a focal length of the third group G3 of the projection optical system 200.

The conditional equation (3) defines a preferable range of a ratio of the focal length $f_3$ of the third group G3 to the focal length f of the entire system of the projection optical system.

If the ratio $f_3/f$ is lower than a lower limit value of 5.5 in the conditional equation (3), the positive power of the third group G3 becomes too strong and the radii of curvature of the lenses are large. Therefore, various aberrations such as spherical aberration are difficult to be compensated, and sufficient performance is difficult to be obtained because of high eccentricity sensitivity of each lens.

On the other hand, if the ratio $f_3/f$ is higher than an upper limit value of 6.0 in the conditional equation (3), the positive power of the third group G3 becomes too weak, which leads to a decrease in telecentric performance on a side of the light valve and an increase in a whole length of the optical lens system, which requires an increased size of the image projection apparatus.

In the second embodiment, the ratio $f_3/f$ is a value of 5.708.

It is preferable that at least one of the positive lenses of the third group G3 satisfy the following conditional equation (4), already described in the first embodiment $$60 < v_d < 80 \quad (4),$$

where $v_d$ represents an Abbe number for d-line of each of the positive lenses of the third group G3.

The conditional equation (4) defines a preferable range of Abbe numbers of the positive lenses of the third group G3 of the projection optical system.

If the Abbe number $v_d$ is lower than a lower limit value of 60 in the conditional equation (4), an amount of the magnification chromatic aberration at a wide angle of view becomes too large, leading to an increase in required memory capacity in the image processing device and a color blur in a red image.

A glass, the Abbe number $v_d$ of which exceeds the upper limit value of 80 in the conditional equation (4), belongs to anomalous dispersion glass, which leads to an increase in lens cost.

In other words, in order to reduce the magnification chromatic aberration sufficiently (e.g., within a length of 1 pixel), it is preferable that the Abbe number of the positive lens in the third group G3 be as large as possible. However, since the glass material having the Abbe number $v_d$ exceeding a value of 80 belongs to anomalous dispersion glass, a cost of the projection optical system increases. If the glass material satisfying the conditional equation (4) is used as the positive lens of the third group, the magnification chromatic aberration can be compensated appropriately at a reduced cost.

In the second embodiment, the Abbe number $v_d$ is a value of 70.4.

Figure 15:
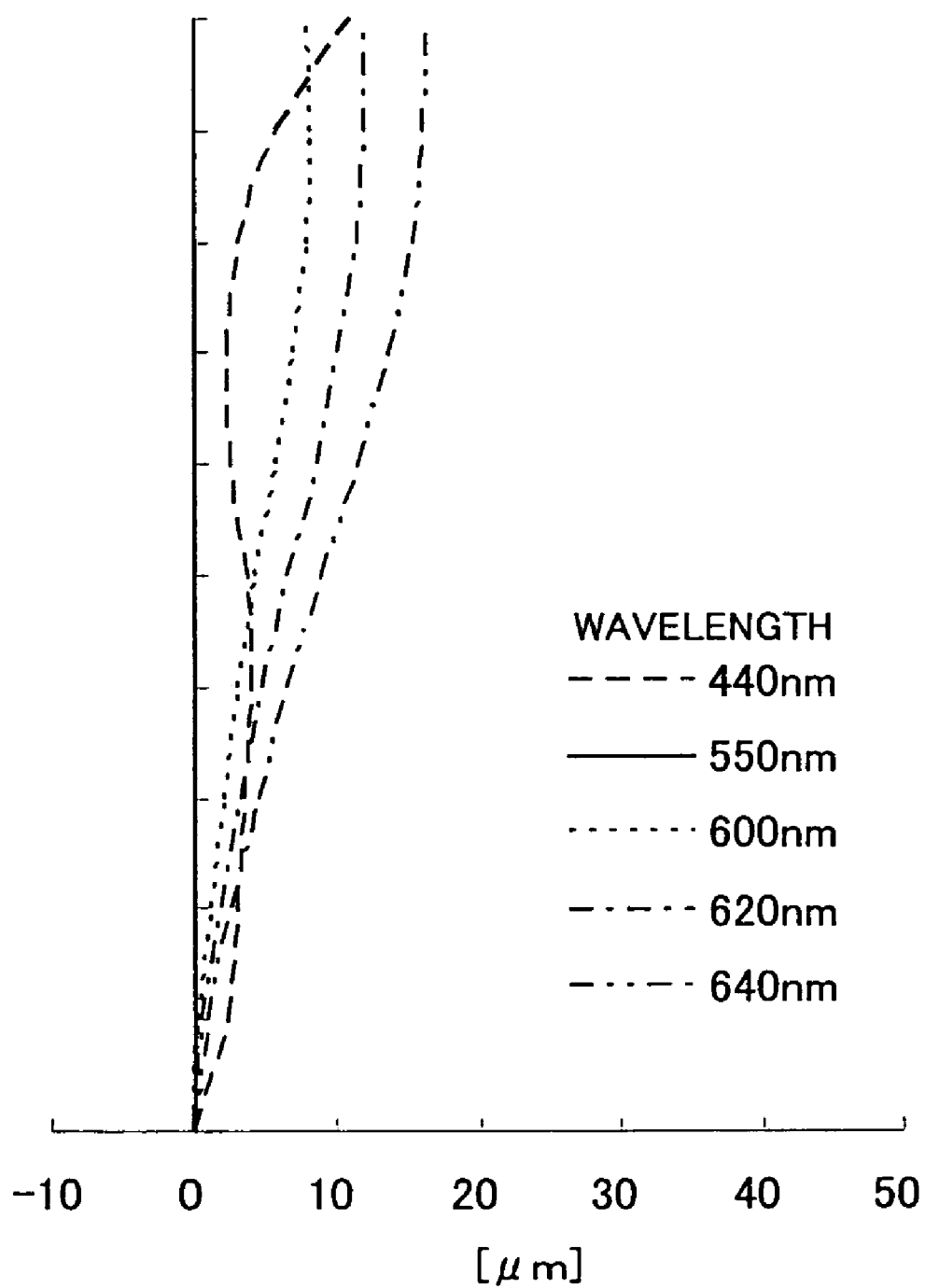
FIG. 15 is a diagram showing deviations on the light valve corresponding to amounts of the magnification chromatic aberrations optically compensated by the projection optical system according to the second embodiment.

FIG. 15 is a diagram showing deviations on the light valve 4 corresponding to amounts of the magnification chromatic aberrations optically compensated by the projection optical system 200 according to the second embodiment. In FIG. 15, a vertical axis indicates an angle of view, and a horizontal axis indicates a deviation on the light valve 4 corresponding to an amount of the magnification chromatic aberration of the projection optical system 200 (i.e., a length on the light valve 4 corresponding to a deviation on the screen 6 resulting from the magnification chromatic aberration of the projection optical system 200). FIG. 15 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 15, at the maximum angle of view, an amount $\Delta L_{B-G}$ of the magnification chromatic aberration on the light valve 4 of the blue light (440 nm) relative to the green light (550 nm) is approximately the same as an amount $\Delta L_{B-G}$ of the magnification chromatic aberration on the light valve 4 of the light having a central wavelength (620 nm) of the red light relative to the green light (550 nm). The amount $\Delta L_{B-G}$ of the magnification chromatic aberration is 11.3 μm, and the amount $\Delta L_{Rm-G}$ of the magnification chromatic aberration is 12.2 μm. Furthermore, as can be understood from FIG. 15, at the maximum angle of view, an amount $\Delta L_{Rl-Rs}$ of the magnification chromatic aberration on the light valve 4 of the light having a maximum wavelength (640 nm) of the red light relative to the light having a minimum wavelength (600 nm) of the red light is 8.4 μm.

In the second embodiment, when the fixed-pixel pitch P of the light valve 4 is a length of 10 μm, the projection optical system 200 satisfies the following conditional equations $$\Delta L_{B-G} > P,$$

$$\Delta L_{Rm-G} > P,$$

and $$\Delta L_{Rl-Rs} \leq P.$$

As described above, in the projection optical system 200 of the second embodiment, the amount $\Delta L_{B-G}$ of the magnification chromatic aberration of the blue light (B) relative to the green light (G) is 11.3 μm, and the amount $\Delta L_{Rm-G}$ of the magnification chromatic aberration of the light (Rm) having a central wavelength of the red light relative to the green light (G) are 12.2 μm. A fixed-pixel pitch P is 10 μm, and an allowable color deviation is a length of 1 pixel or below. Therefore, the image projection apparatus can reduce a color deviation on the screen 6 sufficiently by causing the image processing device 2 to compensate the pixel display position information so as to shift the red pixel by a length of 1 pixel on the screen 6 (which corresponds to 1 fixed-pixel pitch on the light valve 4) and the blue pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 8.4 μm at maximum, which is smaller than the fixed-pixel pitch P, a red color blur becomes insignificant.

As described above, in the image projection apparatus of the second embodiment, since the pixel display position information of the input video signal V1 is image-processed for each color and the compensated video signal V2 that has been compensated in advance is generated, it is not required the projection optical system 200 be formed so as to reduce the magnification chromatic aberration to a very low level.

Therefore, the projection optical system 200 with a wide angle of view and with no anomalous dispersion glass can be implemented, and the image projection apparatus at a reduced cost and a short projection distance lp can be obtained.

Further, in the second embodiment, since the image projection apparatus adopts the optical projection system 200 that can suppress the amount $\Delta L_{Rl-Rs}$ of the magnification chromatic aberration within the red light to a length within 1 fixed-pixel pitch, an image with little color blur can be displayed on the screen 6.

Furthermore, in the second embodiment, since the projection optical system 200 optically compensates the amount $\Delta L_{B-G}$ of the magnification chromatic aberration of the blue light relative to the green light sufficiently and the amount $\Delta L_{Rm-G}$ of the magnification chromatic aberration of the red light relative to the green light within a length of several pixels, the image processing device 2 may compensates the pixel display position information of the red image and the blue image by image-processing. As a result, the image processing can be simplified and a memory capacity of the line memory 22 of the image processing device 2 can be reduced, and a color blur on the screen can be reduced.

Third Embodiment

An image projection apparatus according to the third embodiment of the present invention will be described below.

The image projection apparatus according to the third embodiment is different from that of the first embodiment in a point of the structure of the projection optical system 300 and in a point of the compensation data determined in accordance with the structure of the projection optical system 300 and stored in the compensation data memory 23 of the image processing device 2.

FIG. 16A is a diagram showing a numerical example of the projection optical system in the image projection apparatus according to the third embodiment. The definitions of the surface, the surface number, the radius of curvature, the surface distance, the refractive index, the Abbe number, and the aspherical surface (asterisk *) are similar to those of the first embodiment. Further, FIG. 16B is a diagram showing aspherical data including a conical constant K and aspherical coefficients Aj of the optical surfaces S1 and S2 of the projection optical system in the image projection apparatus according to the third embodiment.

Figure 17:
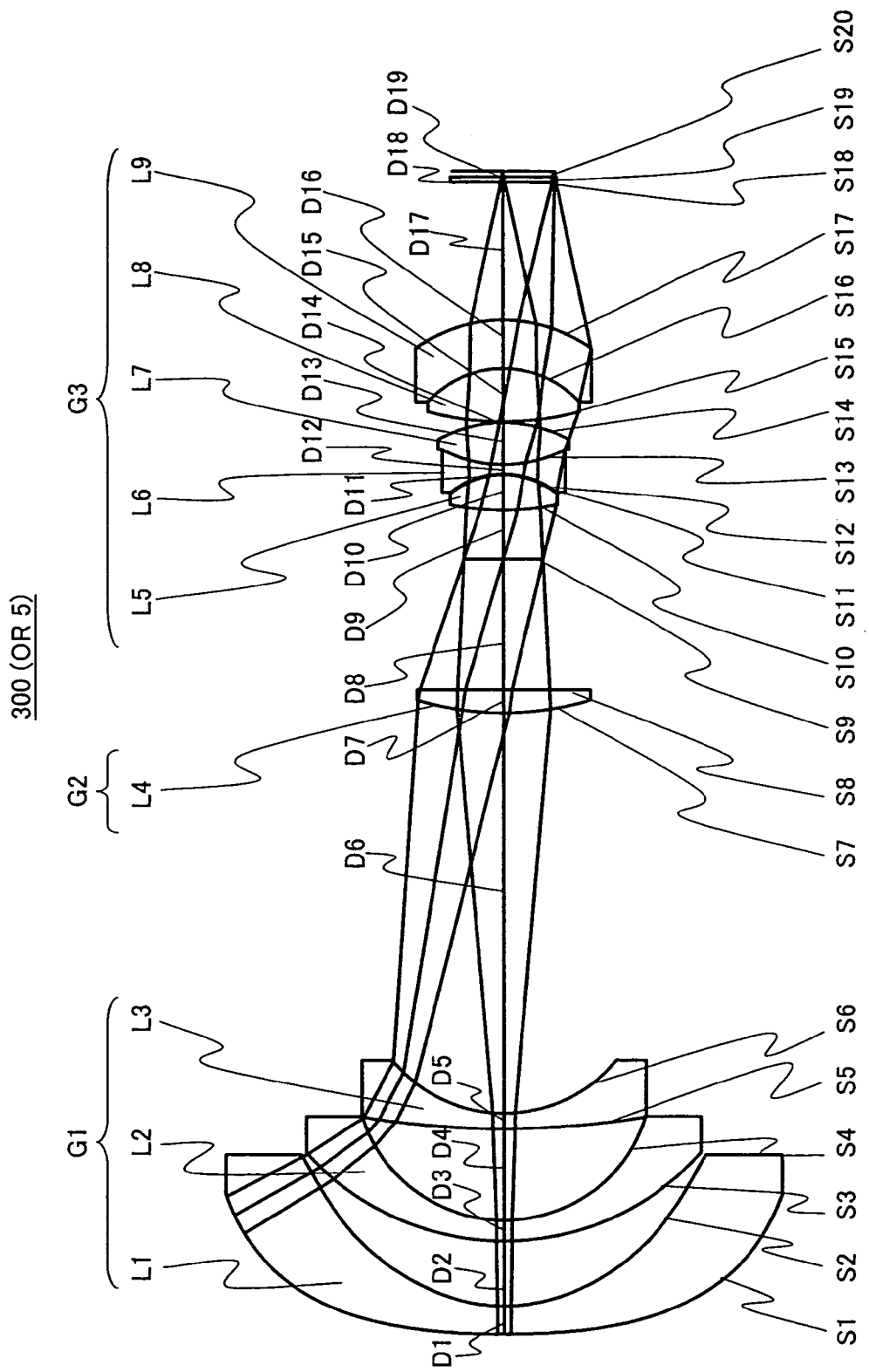
FIG. 17 is a diagram schematically showing a structure of the projection optical system according to the third embodiment.

FIG. 17 is a diagram schematically showing a structure of the projection optical system 300 corresponding to the numerical example shown in FIGS. 16A and 16B. In these figures, S1, S2, . . . , S20 (i.e., Si) represent the surfaces of optical members, i (i=1, 2, . . . , 20) represents the surface number, D1, D2, . . . , D19 represent the surface distances, L1, L2, . . . , L9 represent the lenses of the first, second, and third groups G1-G3 in an order from a magnification side, and S9 represents an aperture stop.

In the third embodiment, the projection optical system 300 has the following specific properties with respect to d-line. A focal length f is 6.320 mm, a lateral magnification M is −1/103.05, an F-number Fno is 2.4, an entire angle of view 2ω of the projection light is 115 degrees, and a projection distance lp (i.e., a distance between a surface of the screen 6 and the surface S1) is 587.33 mm.

The structure and performance of the projection optical system 300 of the third embodiment are similar to those of the first embodiment.

In the third embodiment, values of parameters defined by the conditional equations (1) to (4) are as follows. The ratio $f_1/f$ is −2.435, the ratio $f_2/f$ is 10.642, the ratio $f_3/f$ is 5.758, and the Abbe number $v_d$ is 70.4. The projection optical system 300 therefore satisfies the conditional equations (1) to (4).

Figure 18:
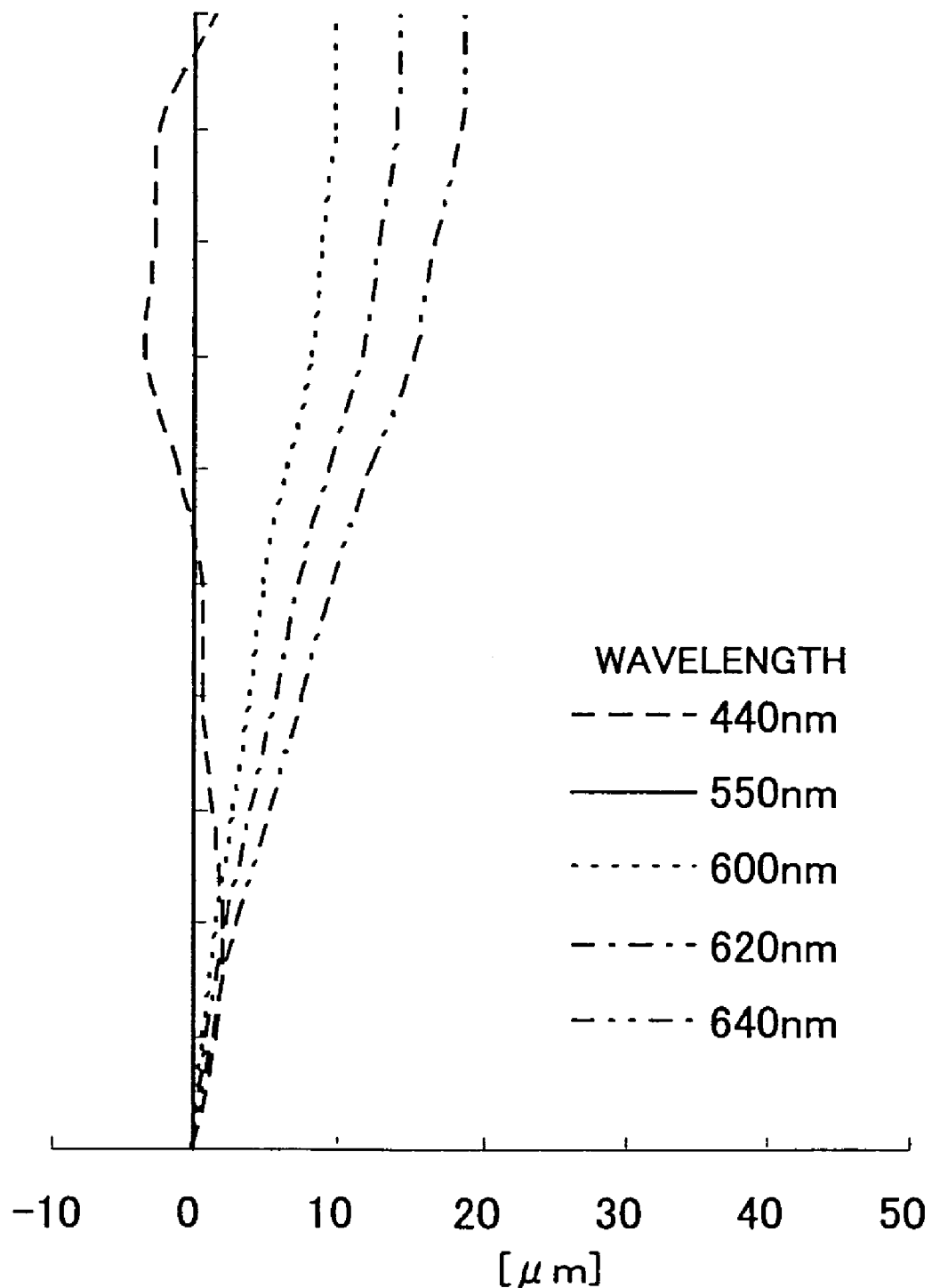
FIG. 18 is a diagram showing deviations on the light valve corresponding to amounts of the magnification chromatic aberrations optically compensated by the projection optical system according to the third embodiment.

FIG. 18 is a diagram showing deviations on the light valve 4 corresponding to amounts of the magnification chromatic aberrations optically compensated by the projection optical system 300 according to the third embodiment. In FIG. 18, a vertical axis indicates an angle of view, and a horizontal axis indicates a deviation on the light valve 4 corresponding to an amount of the magnification chromatic aberration of the projection optical system 300 (i.e., a length on the light valve 4 corresponding to a deviation on the screen 6 resulting from the magnification chromatic aberration of the projection optical system 300). FIG. 18 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 18, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 200) of the blue light (440 nm) relative to the green light (550 nm) is 3.4 µm, and an amount $\Delta L_{Rm-G}$ of the magnification chromatic aberration (i.e., a length $\Delta L_{Rm-G}$ on the light valve 4 corresponding to a deviation on the screen 6 resulting from the magnification chromatic aberration of the projection optical system 300) of the light having a central wavelength (620 nm) of the red light relative to the green light (550 nm) is 14.4 µm. Furthermore, as can be understood from FIG. 18, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 300) of the light having a maximum wavelength (640 nm) of the red light relative to the light having a minimum wavelength (600 nm) of the red light is 9.1 µm.

In the third embodiment, when the fixed-pixel pitch P of the light valve 4 is a length of 10 µm, the projection optical system 300 satisfies the following conditional equations $$\Delta L_{B-G} \leq P,$$

$$\Delta L_{Rm-G} > P,$$

and $$\Delta L_{Rl-Rs} \leq P.$$

As described above, in the projection optical system 300 of the third embodiment, the amount $\Delta L_{B-G}$ of the magnification chromatic aberration of the blue light (B) relative to the green light (G) is 3.4 µm, which is smaller than the fixed-pixel pitch P, and the amount $\Delta L_{Rm-G}$ of the magnification chromatic aberration of the light (Rm) having a central wavelength of the red light relative to the green light (G) are 14.4 µm, which is larger than the fixed-pixel pitch P. Therefore, the image projection apparatus can reduce a color deviation on the screen 6 sufficiently by causing the image processing device 2 to compensate the pixel display position information so as to shift the red pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 9.1 μm at maximum, which is smaller than the fixed-pixel pitch P, a red color blur becomes insignificant.

As described above, in the image projection apparatus of the third embodiment, since the pixel display position information of the input video signal V1 is image-processed for each color and the compensated video signal V2 that has been compensated in advance is generated, it is not required the projection optical system 300 be formed so as to reduce the magnification chromatic aberration to a very low level. Therefore, the projection optical system 300 with a wide angle of view and with no anomalous dispersion glass can be implemented, and the image projection apparatus at a reduced cost and a short projection distance lp can be obtained.

Further, in the third embodiment, since the image projection apparatus adopts the optical projection system 300 that can suppress the amount $\Delta L_{Rl-Rs}$ of the magnification chromatic aberration within the red light to a length within 1 fixed-pixel pitch, an image with little color blur can be displayed on the screen 6.

Furthermore, in the third embodiment, since the projection optical system 300 optically compensates the amount $\Delta L_{B-G}$ of the magnification chromatic aberration of the blue light relative to the green light sufficiently and the amount $\Delta L_{R-G}$ of the magnification chromatic aberration of the red light relative to the green light within a length of several pixels, the image processing device 2 may compensates the pixel display position information of the red image by image-processing. As a result, the image processing can be simplified and a memory capacity of the line memory 22 of the image processing device 2 can be reduced.

Fourth Embodiment

An image projection apparatus according to the fourth embodiment of the present invention will be described below.

The image projection apparatus according to the fourth embodiment is different from that of the first embodiment in a point of the structure of the projection optical system 400 and in a point of the compensation data determined in accordance with the structure of the projection optical system 400 and stored in the compensation data memory 23 of the image processing device 2.

FIG. 19A is a diagram showing a numerical example of the projection optical system in the image projection apparatus according to the fourth embodiment. The definitions of the surface, the surface number, the radius of curvature, the surface distance, the refractive index, the Abbe number, and the aspherical surface (asterisk *) are similar to those of the first embodiment. Further, FIG. 19B is a diagram showing aspherical data including a conical constant K and aspherical coefficients Aj of the optical surfaces S1 and S2 of the projection optical system in the image projection apparatus according to the fourth embodiment.

FIG. 20 is a diagram schematically showing a structure of the projection optical system 400 corresponding to the numerical example shown in FIGS. 19A and 19B. In these figures, S1, S2, ..., S21 (i.e., Si) represent the surfaces of optical members, i (i=1, 2, ..., 21) represents the surface number, D1, D2, ..., D20 represent the surface distances, L1, L2, ..., L9 represent the lenses of the first, second, and third groups G1-G3 in an order from a magnification side, and S9 represents an aperture stop.

In the fourth embodiment, the projection optical system 400 has the following specific properties with respect to d-line. A focal length f is 6.472 mm, a lateral magnification M is −1/103.05, an F-number Fno is 2.4, an entire angle of view 2ω of the projection light is 115 degrees, a projection distance lp (i.e., a distance between a surface of the screen 6 and the surface S1) is 591.35 mm.

The structure and performance of the projection optical system 400 of the fourth embodiment are similar to those of the first embodiment.

In the fourth embodiment, values of parameters defined by the conditional equations (1) to (4) are as follows. The ratio $f_1/f$ is −2.190, the ratio $f_2/f$ is 11.312, the ratio $f_3/f$ is 5.869, and the Abbe number $v_d$ is 70.4. The projection optical system 400 therefore satisfies the conditional equations (1) to (4).

Figure 21:
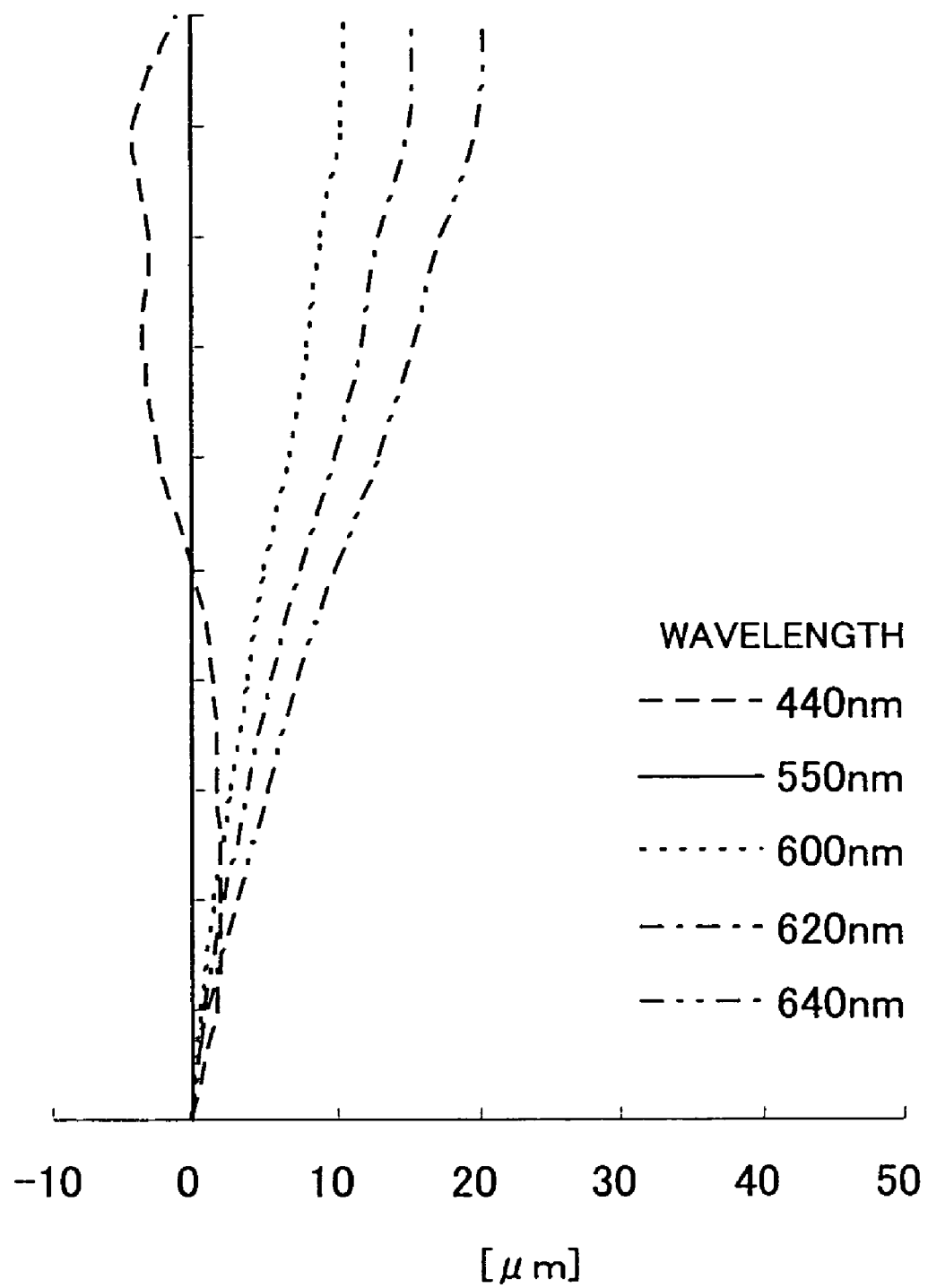
FIG. 21 is a diagram showing deviations on the light valve corresponding to amounts of the magnification chromatic aberrations optically compensated by the projection optical system according to the fourth embodiment.

FIG. 21 is a diagram showing deviations on the light valve 4 corresponding to amounts of the magnification chromatic aberrations optically compensated by the projection optical system 400 according to the fourth embodiment. In FIG. 21, a vertical axis indicates an angle of view, and a horizontal axis indicates a deviation on the light valve 4 corresponding to an amount of the magnification chromatic aberration of the projection optical system 400 (i.e., a length on the light valve 4 corresponding to a deviation on the screen 6 resulting from the magnification chromatic aberration of the projection optical system 400). FIG. 21 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 21, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 400) of the blue light (440 nm) relative to the green light (550 nm) is 4.0 μm, and an amount $\Delta L_{Rm-G}$ of the magnification chromatic aberration (i.e., a length $\Delta L_{Rm-G}$ on the light valve 4 corresponding to a deviation on the screen 6 resulting from the magnification chromatic aberration of the projection optical system 400) of the light having a central wavelength (620 nm) of the red light relative to the green light (550 nm) is 15.6 μm. Furthermore, as can be understood from FIG. 21, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 400) of the light having a maximum wavelength (640 nm) of the red light relative to the light having a minimum wavelength (600 nm) of the red light is 9.9 μm.

In the fourth embodiment, when the fixed-pixel pitch P of the light valve 4 is a length of 10 μm, the projection optical system 400 satisfies the following conditional equations $$\Delta L_{B-G} \leq P,$$

$$\Delta L_{Rm-G} > P,$$

and $$\Delta L_{Rl-Rs} \leq P.$$

As described above, in the projection optical system 400 of the fourth embodiment, the amount $\Delta L_{B-G}$ of the magnification chromatic aberration of the blue light (B) relative to the green light (G) is 4.0 µm, which is smaller than the fixed-pixel pitch P, and the amount $\Delta L_{Rm-G}$ of the magnification chromatic aberration of the light (Rm) having a central wavelength of the red light relative to the green light (G) are 15.6 µm, which is larger than the fixed-pixel pitch P. Therefore, the image projection apparatus can reduce a color deviation on the screen 6 sufficiently by causing the image processing device 2 to compensate the pixel display position information so as to shift the red pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 9.9 µm at maximum, which is smaller than the fixed-pixel pitch P, a red color blur becomes insignificant.

As described above, in the image projection apparatus of the fourth embodiment, since the pixel display position information of the input video signal V1 is image-processed for each color and the compensated video signal V2 that has been compensated in advance is generated, it is not required the projection optical system 400 be formed so as to reduce the magnification chromatic aberration to a very low level. Therefore, the projection optical system 400 with a wide angle of view and with no anomalous dispersion glass can be implemented, and the image projection apparatus at a reduced cost and a short projection distance lp can be obtained.

Further, in the fourth embodiment, since the image projection apparatus adopts the optical projection system 400 that can suppress the amount $L_{Rl-Rs}$ of the magnification chromatic aberration within the red light to a length within 1 fixed-pixel pitch, an image with little color blur can be displayed on the screen 6.

Furthermore, in the fourth embodiment, since the projection optical system 400 optically compensates the amount $\Delta L_{B-G}$ of the magnification chromatic aberration of the blue light relative to the green light sufficiently and the amount $\Delta L_{Rm-G}$ of the magnification chromatic aberration of the red light relative to the green light within a length of several pixels, the image processing device 2 may compensates the pixel display position information of the red image by image-processing. As a result, the image processing can be simplified and a memory capacity of the line memory 22 of the image processing device 2 can be reduced.

Fifth Embodiment

An image projection apparatus according to the fifth embodiment of the present invention will be described below.

The image projection apparatus according to the fifth embodiment is different from that of the first embodiment in a point of the structure of the projection optical system 500 and in a point of the compensation data determined in accordance with the structure of the projection optical system 500 and stored in the compensation data memory 23 of the image processing device 2.

FIG. 22A is a diagram showing a numerical example of the projection optical system in the image projection apparatus according to the fifth embodiment. The definitions of the surface, the surface number, the radius of curvature, the surface distance, the refractive index, the Abbe number, and the aspherical surface (asterisk *) are similar to those of the first embodiment. Further, FIG. 22B is a diagram showing aspherical data including a conical constant K and aspherical coefficients Aj of the optical surfaces S1 and S2 of the projection optical system in the image projection apparatus according to the fifth embodiment.

Figure 23:
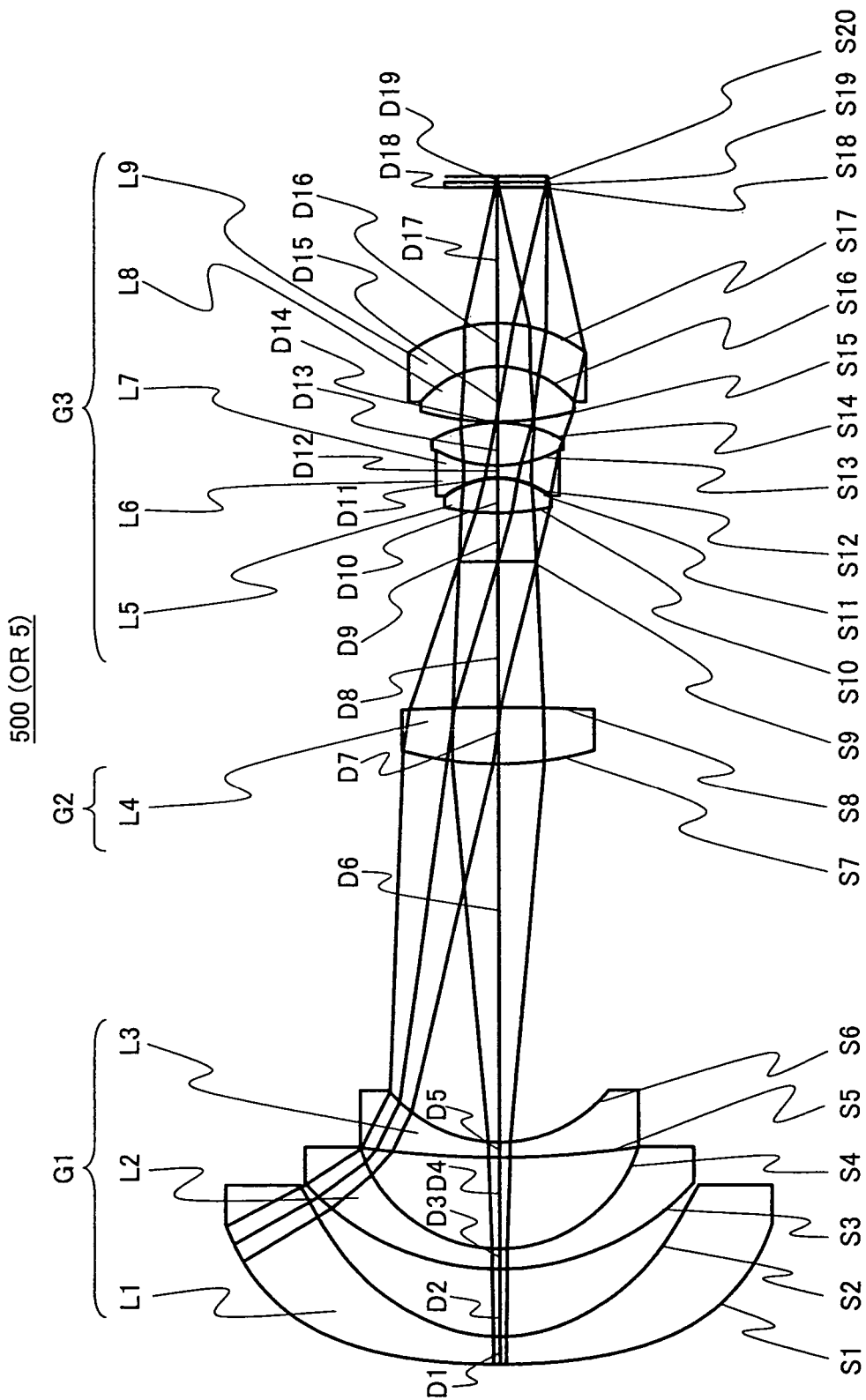
FIG. 23 is a diagram schematically showing a structure of the projection optical system according to the fifth embodiment.

FIG. 23 is a diagram schematically showing a structure of the projection optical system 500 corresponding to the numerical example shown in FIGS. 22A and 22B. In these figures, S1, S2, . . . , S20 (i.e., Si) represent the surfaces of optical members respectively, i (i=1, 2, . . . , 20) represents the surface number, D1, D2, . . . , D19 represent the surface distances respectively, L1, L2, . . . , L9 represent the lenses of the first, second, and third groups G1-G3 in an order from a magnification side respectively, and S9 represents an aperture stop.

In the fifth embodiment, the projection optical system 500 has the following specific properties with respect to d-line. A focal length f is 6.390 mm, a lateral magnification M is −1/103.05, an F-number Fno is 2.4, an entire angle of view 2ω of the projection light is 115 degrees, and a projection distance lp (i.e., a distance between a surface of the screen 6 and the surface S1) is 589.76 mm.

The structure and performance of the projection optical system 500 of the fifth embodiment are similar to those of the first embodiment.

In the fifth embodiment, values of parameters defined by the conditional equations (1) to (4) are as follows. The ratio $f_1/f$ is −2.344, the ratio $f_2/f$ is 10.732, the ratio $f_3/f$ is 5.591, and the Abbe number $v_d$ is 70.4. The projection optical system 500 therefore satisfies the conditional equations (1) to (4).

Figure 24:
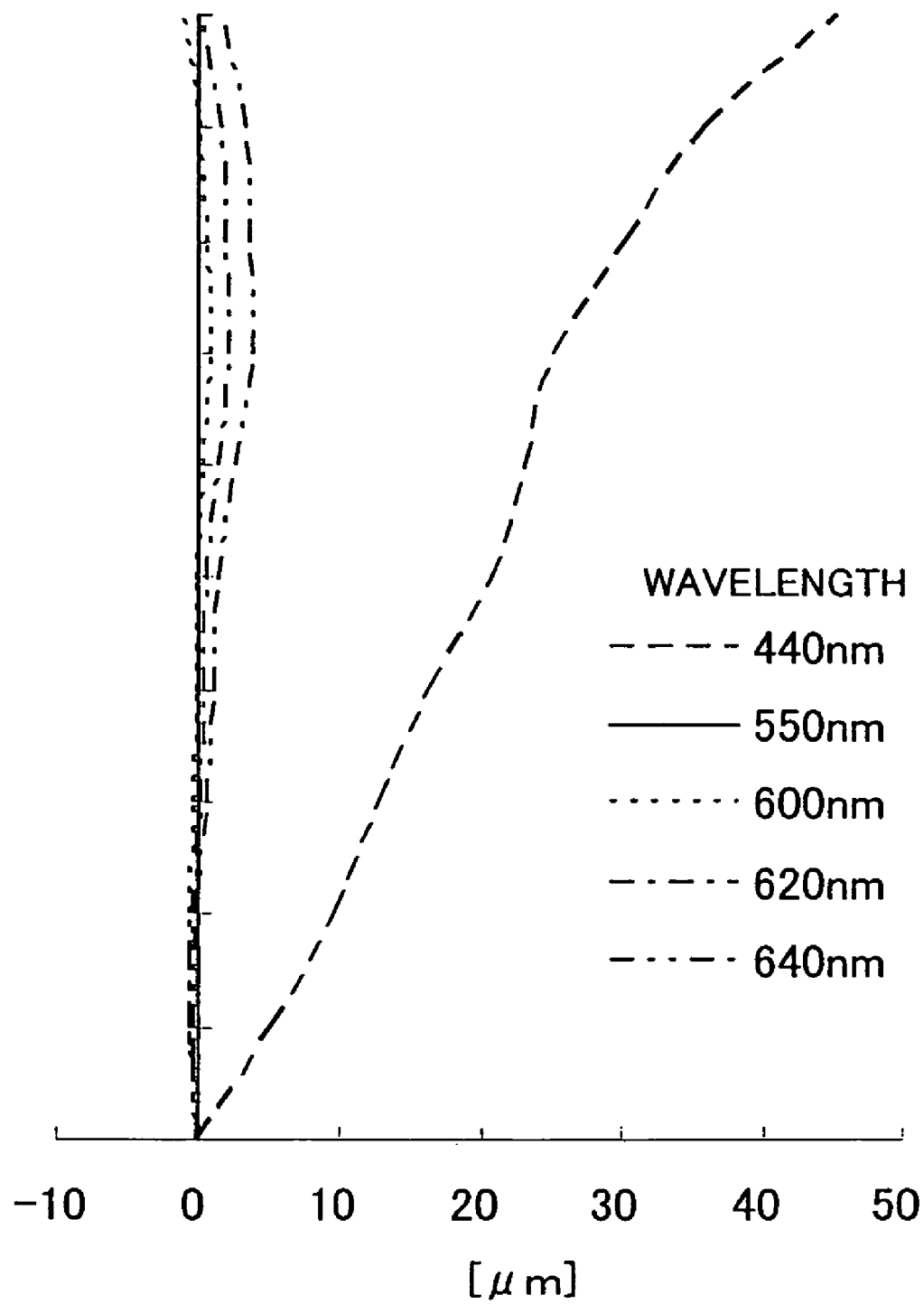
FIG. 24 is a diagram showing deviations on the light valve corresponding to amounts of the magnification chromatic aberrations optically compensated by the projection optical system according to the fifth embodiment.

FIG. 24 is a diagram showing deviations on the light valve 4 corresponding to amounts of the magnification chromatic aberrations optically compensated by the projection optical system 500 according to the fifth embodiment. In FIG. 24, a vertical axis indicates an angle of view, and a horizontal axis indicates a deviation on the light valve 4 corresponding to an amount of the magnification chromatic aberration of the projection optical system 500 (i.e., a length on the light valve 4 corresponding to a deviation on the screen 6 resulting from the magnification chromatic aberration of the projection optical system 500). FIG. 24 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 24, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 500) of the blue light (440 nm) relative to the green light (550 nm) is 45.5 µm, and an amount $\Delta L_{Rm-G}$ of the magnification chromatic aberration (i.e., a length $\Delta L_{Rm-G}$ on the light valve 4 corresponding to a deviation on the screen 6 resulting from the magnification chromatic aberration of the projection optical system 500) of the light having a central wavelength (620 nm) of the red light relative to the green light (550 nm) is 2.4 µm. Furthermore, as can be understood from FIG. 24, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 500) of the light having a maximum wavelength (640 nm) of the red light relative to the light having a minimum wavelength (600 nm) of the red light is 3.0 µm.

In the fifth embodiment, when the fixed-pixel pitch P of the light valve 4 is a length of 10 μm, the projection optical system 500 satisfies the following conditional equations $$\Delta L_{B-G} > P,$$

$$\Delta L_{Rm-G} \leq P,$$

and $$\Delta L_{Rl-Rs} \leq P.$$

As described above, in the projection optical system 500 of the fifth embodiment, the amount $\Delta L_{B-G}$ of the magnification chromatic aberration of the blue light (B) relative to the green light (G) is 2.4 μm, which is smaller than the fixed-pixel pitch P, and the amount $\Delta L_{Rm-G}$ of the magnification chromatic aberration of the light (Rm) having a central wavelength of the red light relative to the green light (G) are 45.5 μm, which is larger than the fixed-pixel pitch P. Therefore, the image projection apparatus can reduce a color deviation on the screen 6 sufficiently by causing the image processing device 2 to compensate the pixel display position information so as to shift the red pixel by a length of 4 pixels on the screen 6 (which corresponds to 4 fixed-pixel pitches on the light valve 4).

Further, since the amount $\Delta L_{Rl-Rs}$ of the magnification chromatic aberration (600 nm to 640 nm) within the red light is 3.0 μm at maximum, which is smaller than the fixed-pixel pitch P, a red color blur becomes insignificant.

As described above, in the image projection apparatus of the fifth embodiment, since the pixel display position information of the input video signal V1 is image-processed for each color and the compensated video signal V2 that has been compensated in advance is generated, it is not required the projection optical system 500 be formed so as to reduce the magnification chromatic aberration to a very low level. Therefore, the projection optical system 500 with a wide angle of view and with no anomalous dispersion glass can be implemented, and the image projection apparatus at a reduced cost and a short projection distance lp can be obtained.

Further, in the fifth embodiment, since the image projection apparatus adopts the optical projection system 500 that can suppress the amount $\Delta L_{Rl-Rs}$ of the magnification chromatic aberration within the red light to a length within 1 fixed-pixel pitch, an image with little color blur can be displayed on the screen 6.

Furthermore, in the fifth embodiment, since the projection optical system 500 optically compensates the amount $\Delta L_{B-G}$ of the magnification chromatic aberration of the blue light relative to the green light sufficiently and the amount $\Delta L_{Rm-G}$ of the magnification chromatic aberration of the red light relative to the green light within a length of several pixels, the image processing device 2 may compensates the pixel display position information of the blue image by image-processing. As a result, the image processing can be simplified and a memory capacity of the line memory 22 of the image processing device 2 can be reduced.

Moreover, in the fifth embodiment, since the image processing device 2 compensates only the pixel display positions of the blue image (people do not have high sensibility to this color), a high quality image can be displayed on the screen 6.

Sixth Embodiment

An image projection apparatus according to the sixth embodiment of the present invention will be described below.

The image projection apparatus according to the sixth embodiment is different from that of the first embodiment in a point of the structure of the projection optical system 600 and in a point of the compensation data determined in accordance with the structure of the projection optical system 600 and stored in the compensation data memory 23 of the image processing device 2.

FIG. 25A is a diagram showing a numerical example of the projection optical system in the image projection apparatus according to the sixth embodiment. The definitions of the surface, the surface number, the radius of curvature, the surface distance, the refractive index, the Abbe number, and the aspherical surface (asterisk *) are similar to those of the first embodiment. Further, FIG. 25B is a diagram showing aspherical data including a conical constant K and aspherical coefficients Aj of the optical surfaces S1 and S2 of the projection optical system in the image projection apparatus according to the sixth embodiment.

Figure 26:
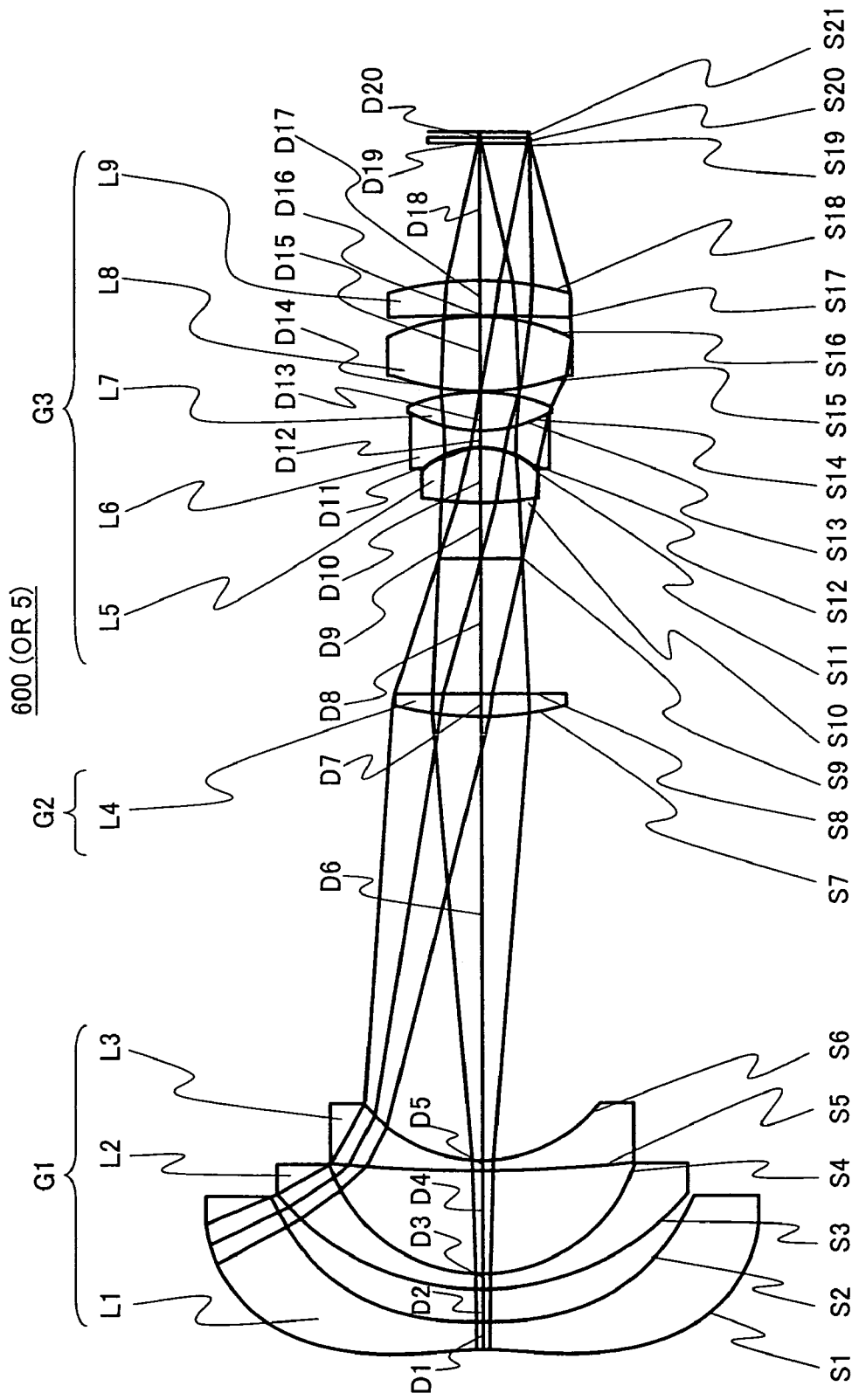
FIG. 26 is a diagram schematically showing a structure of the projection optical system according to the sixth embodiment.

FIG. 26 is a diagram schematically showing a structure of the projection optical system 600 corresponding to the numerical example shown in FIGS. 25A and 25B. In these figures, S1, S2, . . . , S21 (i.e., Si) represent the surfaces of optical members respectively, i (i=1, 2, . . . , 21) represents the surface number, D1, D2, . . . , D20 represent the surface distances respectively, L1, L2, . . . , L9 represent the lenses of the first, second, and third groups G1-G3 in an order from a magnification side respectively, and S9 represents an aperture stop.

In the sixth embodiment, the projection optical system 600 has the following specific properties with respect to d-line. A focal length f is 6.544 mm, a lateral magnification M is −1/103.05, an F-number Fno is 2.4, an entire angle of view 2ω of the projection light is 115 degrees, a projection distance lp (i.e., a distance between a surface of the screen 6 and the surface S1) is 589.33 mm.

The structure and performance of the projection optical system 600 of the sixth embodiment are similar to those of the second embodiment.

In the sixth embodiment, values of parameters defined by the conditional equations (1) to (4) are as follows. The ratio $f_1/f$ is −1.878, the ratio $f_2/f$ is 11.264, the ratio $f_3/f$ is 5.644, and the Abbe number $v_d$ is 70.4. The projection optical system 600 therefore satisfies the conditional equations (1) to (4).

Figure 27:
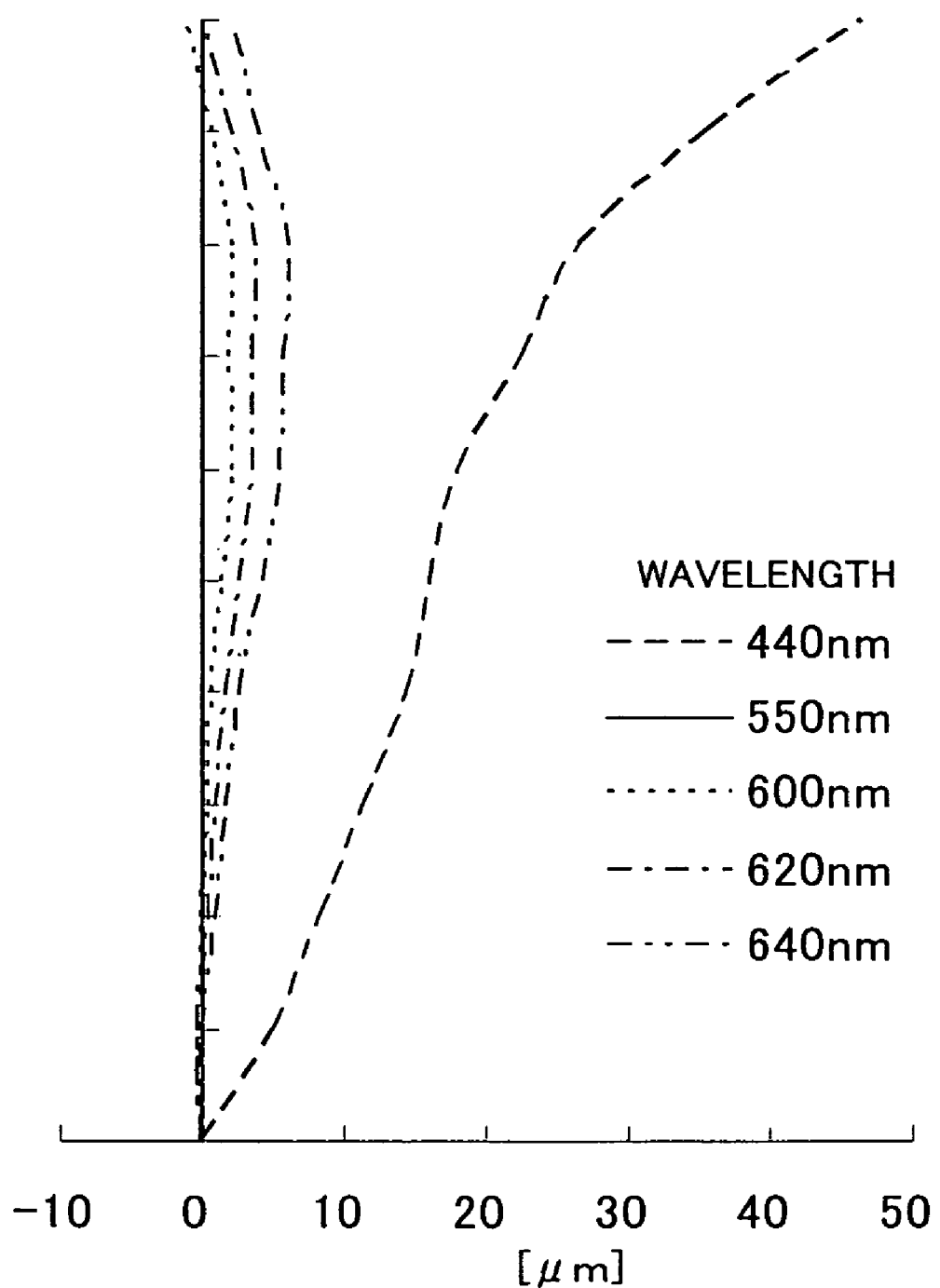
FIG. 27 is a diagram showing deviations on the light valve corresponding to amounts of the magnification chromatic aberrations optically compensated by the projection optical system according to the sixth embodiment.

FIG. 27 is a diagram showing deviations on the light valve 4 corresponding to amounts of the magnification chromatic aberrations optically compensated by the projection optical system 600 according to the sixth embodiment. In FIG. 27, a vertical axis indicates an angle of view, and a horizontal axis indicates a deviation on the light valve 4 corresponding to an amount of the magnification chromatic aberration of the projection optical system 600 (i.e., a length on the light valve 4 corresponding to a deviation on the screen 6 resulting from the magnification chromatic aberration of the projection optical system 600). FIG. 27 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 27, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 600) of the blue light (440 nm) relative to the green light (550 nm) is 46.8 µm, and an amount $\Delta L_{Rm-G}$ of the magnification chromatic aberration (i.e., a length $\Delta L_{Rm-G}$ on the light valve 4 corresponding to a deviation on the screen 6 resulting from the magnification chromatic aberration of the projection optical system 600) of the light having a central wavelength (620 nm) of the red light relative to the green light (550 nm) is 3.9 µm. Furthermore, as can be understood from FIG. 27, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 600) of the light having a maximum wavelength (640 nm) of the red light relative to the light having a minimum wavelength (600 nm) of the red light is 4.0 µm.

In the sixth embodiment, when the fixed-pixel pitch P of the light valve 4 is a length of 10 µm, the projection optical system 600 satisfies the following conditional equations $$\Delta L_{B-G} > P,$$

$$\Delta L_{Rm-G} \leq P,$$

and $$\Delta L_{Rl-Rs} \leq P$$

As described above, in the projection optical system 600 of the sixth embodiment, the amount $\Delta L_{B-G}$ of the magnification chromatic aberration of the blue light (B) relative to the green light (G) is 3.9 µm, which is smaller than the fixed-pixel pitch P, and the amount $\Delta L_{Rm-G}$ of the magnification chromatic aberration of the light (Rm) having a central wavelength of the red light relative to the green light (G) are 46.8 µm, which is larger than the fixed-pixel pitch P. Therefore, the image projection apparatus can reduce a color deviation on the screen 6 sufficiently by causing the image processing device 2 to compensate the pixel display position information so as to shift the red pixel by a length of 4 pixels on the screen 6 (which corresponds to 4 fixed-pixel pitches on the light valve 4).

Further, since the amount $\Delta L_{Rl-Rs}$ of the magnification chromatic aberration (600 nm to 640 nm) within the red light is 4.0 µm at maximum, which is smaller than the fixed-pixel pitch P, a red color blur becomes insignificant.

Further, when compensating the pixel display position information, it should be noted that people do not have high sensibility to the blue in comparison with the red or green. For this reason, it is preferable that only blue image be compensated by means of image processing of the image processing device 2 in order to display a high quality image on the screen 6.

As described above, in the image projection apparatus of the sixth embodiment, since the pixel display position information of the input video signal V1 is image-processed for each color and the compensated video signal V2 that has been compensated in advance is generated, it is not required the projection optical system 600 be formed so as to reduce the magnification chromatic aberration to a very low level. Therefore, the projection optical system 600 with a wide angle of view and with no anomalous dispersion glass can be implemented, and the image projection apparatus at a reduced cost and a short projection distance lp can be obtained.

Further, in the sixth embodiment, since the image projection apparatus adopts the optical projection system 600 that can suppress the amount $\Delta L_{Rl-Rs}$ of the magnification chromatic aberration within the red light to a length within 1 fixed-pixel pitch, an image with little color blur can be displayed on the screen 6.

Furthermore, in the sixth embodiment, since the projection optical system 600 optically compensates the amount $\Delta L_{Rm-G}$ of the magnification chromatic aberration of the red light relative to the green light sufficiently and the amount $\Delta L_{B-G}$ of the magnification chromatic aberration of the blue light relative to the green light within a length of several pixels, the image processing device 2 may compensates the pixel display positions of the blue image by image-processing. As a result, the image processing can be simplified and a memory capacity of the line memory 22 of the image processing device can be reduced.

Moreover, in the sixth embodiment, since the projection optical system 600 optically compensates the amount $\Delta L_{B-G}$ of the magnification chromatic aberration of the blue light relative to the green light sufficiently and the amount $\Delta L_{Rm-G}$ of the magnification chromatic aberration of the red light relative to the green light within a length of several pixels, the image processing device 2 may compensates the pixel display position information of the blue image by image-processing. As a result, the image processing can be simplified and a memory capacity of the line memory 22 of the image processing device 2 can be reduced.

In addition, in the sixth embodiment, since the image processing device 2 compensates only the pixel display positions of the blue image (people do not have high sensibility to this color), a high quality image can be displayed on the screen 6.

Seventh Embodiment

An image projection apparatus according to the seventh embodiment of the present invention will be described below.

The image projection apparatus according to the seventh embodiment is different from that of the first embodiment in a point of the structure of the projection optical system 700 and in a point of the compensation data determined in accordance with the structure of the projection optical system 700 and stored in the compensation data memory 23 of the image processing device 2.

FIG. 28A is a diagram showing a numerical example of the projection optical system in the image projection apparatus according to the seventh embodiment. The definitions of the surface, the surface number, the radius of curvature, the surface distance, the refractive index, the Abbe number, and the aspherical surface (asterisk *) are similar to those of the first embodiment. Further, FIG. 28B is a diagram showing aspherical data including a conical constant K and aspherical coefficients Aj of the optical surfaces S1 and S2 of the projection optical system in the image projection apparatus according to the seventh embodiment.

Figure 29:
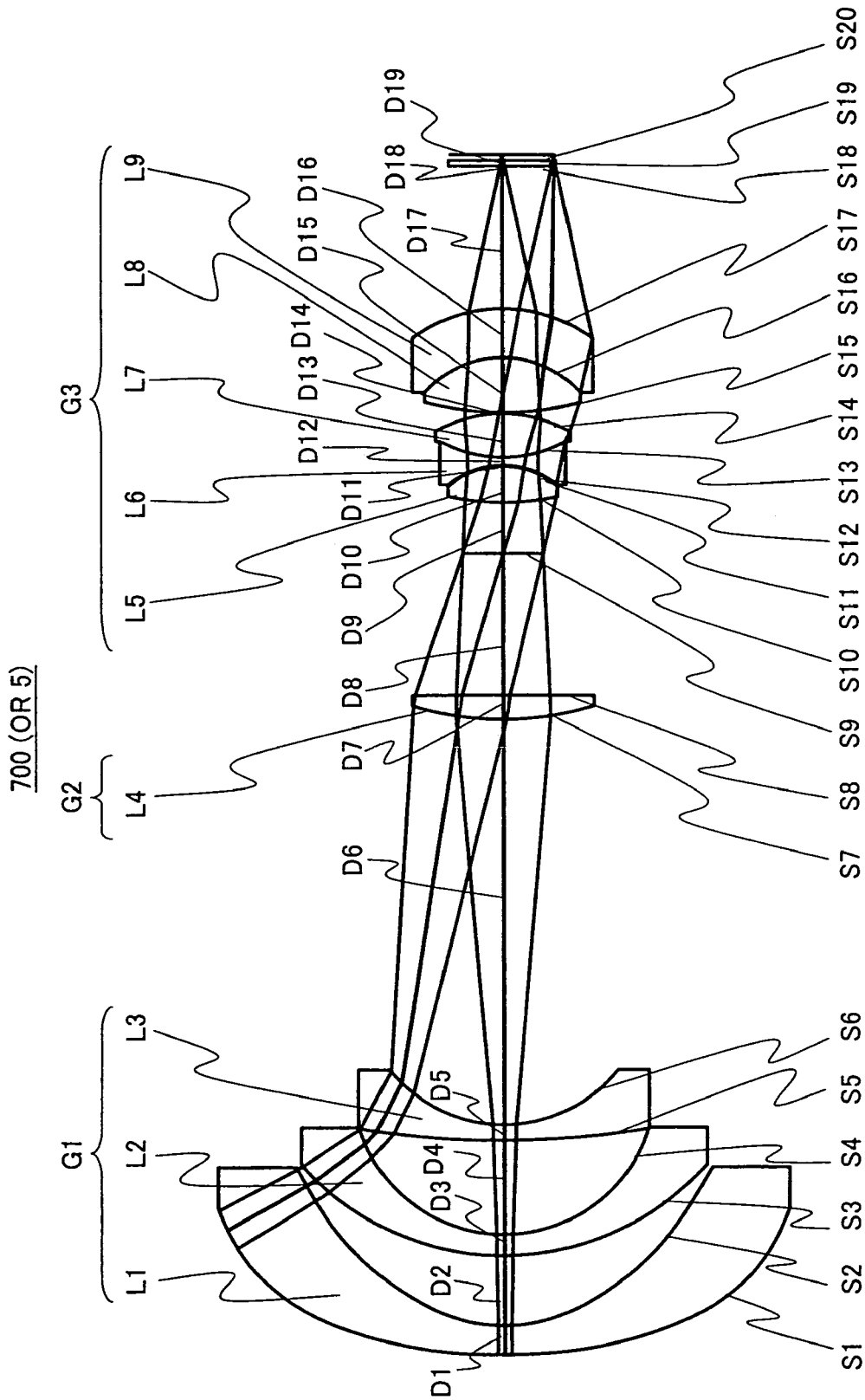
FIG. 29 is a diagram schematically showing a structure of the projection optical system according to the seventh embodiment.

FIG. 29 is a diagram schematically showing a structure of the projection optical system 700 corresponding to the numerical example shown in FIGS. 28A and 28B. In these figures, S1, S2, . . . , S20 (i.e., Si) represent the surfaces of optical members respectively, i (i=1, 2, . . . , 20) represents the surface number, D1, D2, . . . , D19 represent the surface distances respectively, L1, L2, . . . , L9 represent the lenses of the first, second, and third groups G1-G3 in an order from a magnification side respectively, and S9 represents an aperture stop.

In the seventh embodiment, the projection optical system 700 has the following specific properties with respect to d-line. A focal length f is 6.307 mm, a lateral magnification M is −1/90.37, an F-number Fno is 2.4, an entire angle of view 2ω of the projection light is 115 degrees, and a projection distance lp (i.e., a distance between a surface of the screen 6 and the surface S1) is 507.54 mm.

The structure and performance of the projection optical system 700 of the seventh embodiment are similar to those of the first embodiment.

In the seventh embodiment, values of parameters defined by the conditional equations (1) to (4) are as follows. The ratio $f_1/f$ is −2.412, the ratio $f_2/f$ is 10.710, the ratio $f_3/f$ is 5.724, and the Abbe number $v_d$ is 70.4. The projection optical system 700 therefore satisfies the conditional equations (1) to (4).

Figure 30:
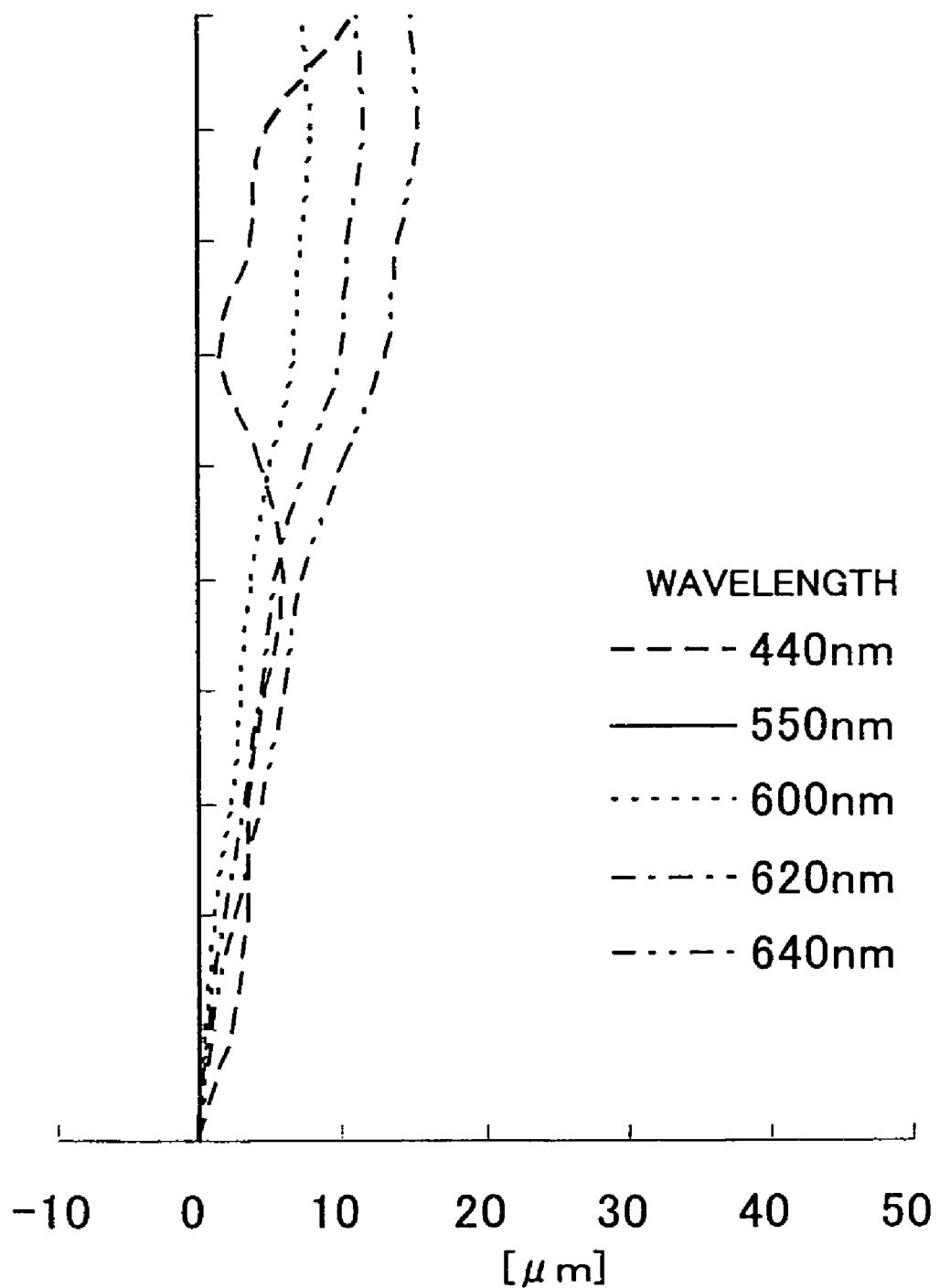
FIG. 30 is a diagram showing deviations on the light valve corresponding to amounts of the magnification chromatic aberrations optically compensated by the projection optical system according to the seventh embodiment.

FIG. 30 is a diagram showing deviations on the light valve 4 corresponding to amounts of the magnification chromatic aberrations optically compensated by the projection optical system 700 according to the seventh embodiment. In FIG. 30, a vertical axis indicates an angle of view, and a horizontal axis indicates a deviation on the light valve 4 corresponding to an amount of the magnification chromatic aberration of the projection optical system 700 (i.e., a length on the light valve 4 corresponding to a deviation on the screen 6 resulting from the magnification chromatic aberration of the projection optical system 700). FIG. 30 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 30, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 700) of the blue light (440 nm) relative to the green light (550 nm) is approximately the same as an amount $\Delta L_{Rm-G}$ of the magnification chromatic aberration (i.e. a length $\Delta L_{Rm-G}$ on the light valve 4 corresponding to a deviation on the screen 6 resulting from the magnification chromatic aberration of the projection optical system 700) of the light having a central wavelength (620 nm) of the red light relative to the green light (550 nm). The amount $\Delta L_{B-G}$ of the magnification chromatic aberration is 11.2 μm, and the amount $\Delta L_{Rm-G}$ of the magnification chromatic aberration is 11.2 μm. Furthermore, as can be understood from FIG. 30, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 700) of the light having a maximum wavelength (640 nm) of the red light relative to the light having a minimum wavelength (600 nm) of the red light is 7.6 μm.

In the seventh embodiment, when the fixed-pixel pitch P of the light valve 4 is a length of 10 μm, the projection optical system 700 satisfies the following conditional equations $\Delta L_{B-G} > P,$ $\Delta L_{Rm-G} > P,$ and $\Delta L_{Rl-Rs} \leq P.$ As described above, in the projection optical system 700 of the seventh embodiment, the amount $\Delta L_{B-G}$ of the magnification chromatic aberration of the blue light (B) relative to the green light (G) is 11.2 μm and the amount $\Delta L_{Rm-G}$ of the magnification chromatic aberration of the light (Rm) having a central wavelength of the red light relative to the green light (G) are 11.2 μm. A fixed-pixel pitch P is 10 μm, and an allowable color deviation is a length of 1 pixel or below. Therefore, the image projection apparatus can reduce a color deviation on the screen 6 sufficiently by causing the image processing device 2 to compensate the pixel display position information so as to shift the red pixel and the blue pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 7.6 μm at maximum, which is smaller than the fixed-pixel pitch P, a red color blur becomes insignificant.

As described above, in the image projection apparatus of the seventh embodiment, since the pixel display position information of the input video signal V1 is image-processed for each color and the compensated video signal V2 that has been compensated in advance is generated, it is not required the projection optical system 700 be formed so as to reduce the magnification chromatic aberration to a very low level. Therefore, the projection optical system 700 with a wide angle of view and with no anomalous dispersion glass can be implemented, and the image projection apparatus at a reduced cost and a short projection distance lp can be obtained.

Further, in the seventh embodiment, since the image projection apparatus adopts the optical projection system 700 that can suppress the amount $\Delta L_{Rl-Rs}$ of the magnification chromatic aberration within the red light to a length within 1 fixed-pixel pitch, an image with little color blur can be displayed on the screen 6.

Furthermore, in the seventh embodiment, since the projection optical system 700 optically compensates the amount $\Delta L_{Rm-G}$ of the magnification chromatic aberration of the red light relative to the green light sufficiently and the amount $\Delta L_{B-G}$ of the magnification chromatic aberration of the blue light relative to the green light within a length of several pixels, the image processing device 2 may compensates the pixel display positions of the blue image by image-processing. As a result, the image processing can be simplified and a memory capacity of the line memory 22 of the image processing device can be reduced.

Eighth Embodiment

An image projection apparatus according to the eighth embodiment of the present invention will be described below.

The image projection apparatus according to the eighth embodiment is different from that of the first embodiment in a point of the structure of the projection optical system 800 and in a point of the compensation data determined in accordance with the structure of the projection optical system 800 and stored in the compensation data memory 23 of the image processing device 2.

FIG. 31A is a diagram showing a numerical example of the projection optical system in the image projection apparatus according to the eighth embodiment. The definitions of the surface, the surface number, the radius of curvature, the surface distance, the refractive index, the Abbe number, and the aspherical surface (asterisk *) are similar to those of the first embodiment. Further, FIG. 31B is a diagram showing aspherical data including a conical constant K and aspherical coefficients Aj of the optical surfaces S1 and S2 of the projection optical system in the image projection apparatus according to the eighth embodiment.

Figure 32:
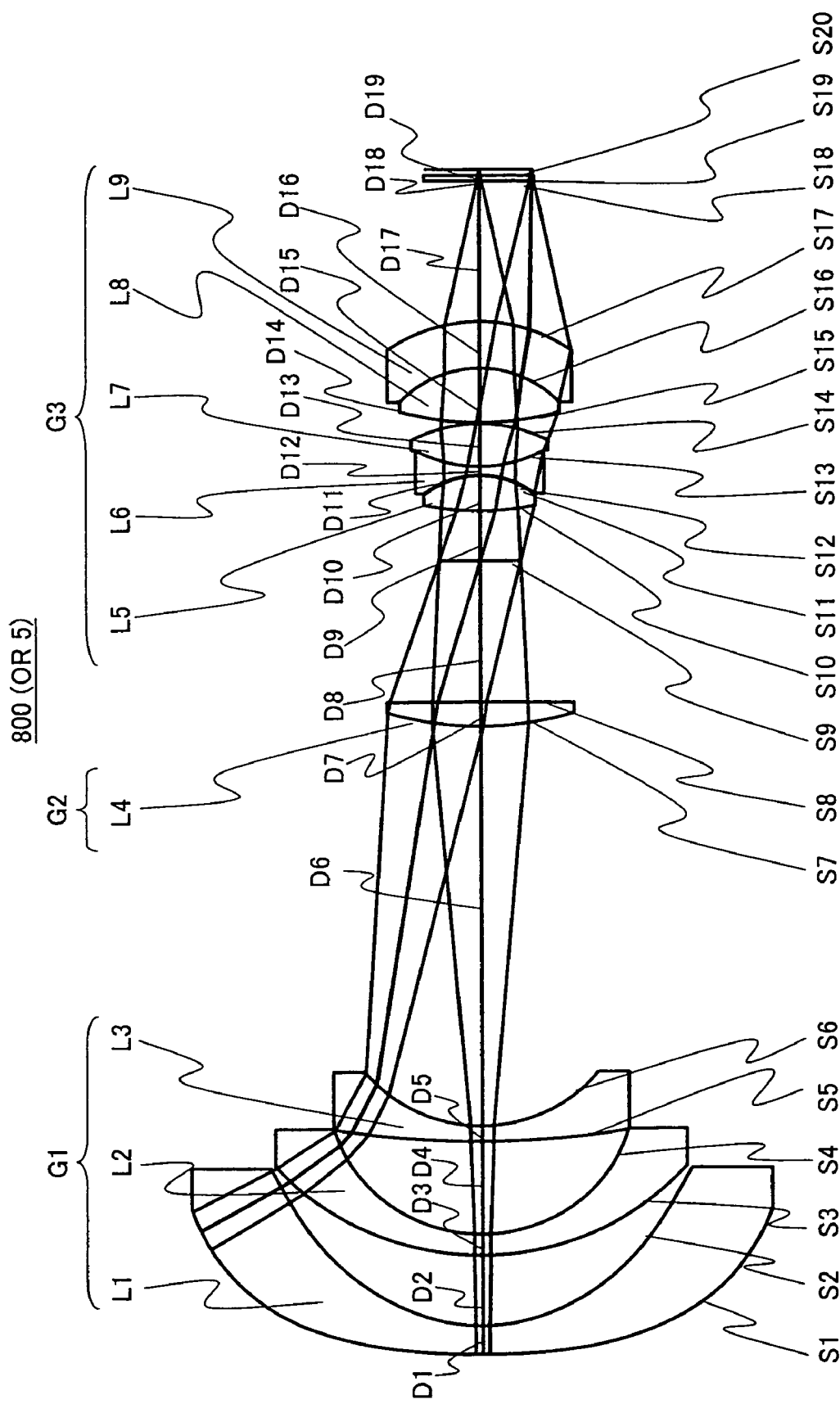
FIG. 32 is a diagram schematically showing a structure of the projection optical system according to the eighth embodiment.

FIG. 32 is a diagram schematically showing a structure of the projection optical system 800 corresponding to the numerical example shown in FIGS. 31A and 31B. In these figures, S1, S2, ..., S20 (i.e., Si) represent the surfaces of optical members respectively, i (i=1, 2, ..., 20) represents the surface number, D1, D2, ..., D19 represent the surface distances respectively, L1, L2, ..., L9 represent the lenses of the first, second, and third groups G1-G3 in an order from a magnification side respectively, and S9 represents an aperture stop.

In the seventh embodiment, the projection optical system 700 has the following specific properties with respect to d-line. A focal length f is 6.346 mm, a lateral magnification M is −1/115.74, an F-number Fno is 2.4, an entire angle of view 2ω of the projection light is 115 degrees, and a projection distance lp (i.e., a distance between a surface of the screen 6 and the surface S1) is 666.50 mm.

The structure and performance of the projection optical system 800 of the eighth embodiment are similar to those of the first embodiment.

In the eighth embodiment, values of parameters defined by the conditional equations (1) to (4) are as follows. The ratio $f_1/f$ is −2.401, the ratio $f_2/f$ is 10.633, the ratio $f_3/f$ is 5.591, and the Abbe number $v_d$ is 70.4. The projection optical system 800 therefore satisfies the conditional equations (1) to (4).

Figure 33:
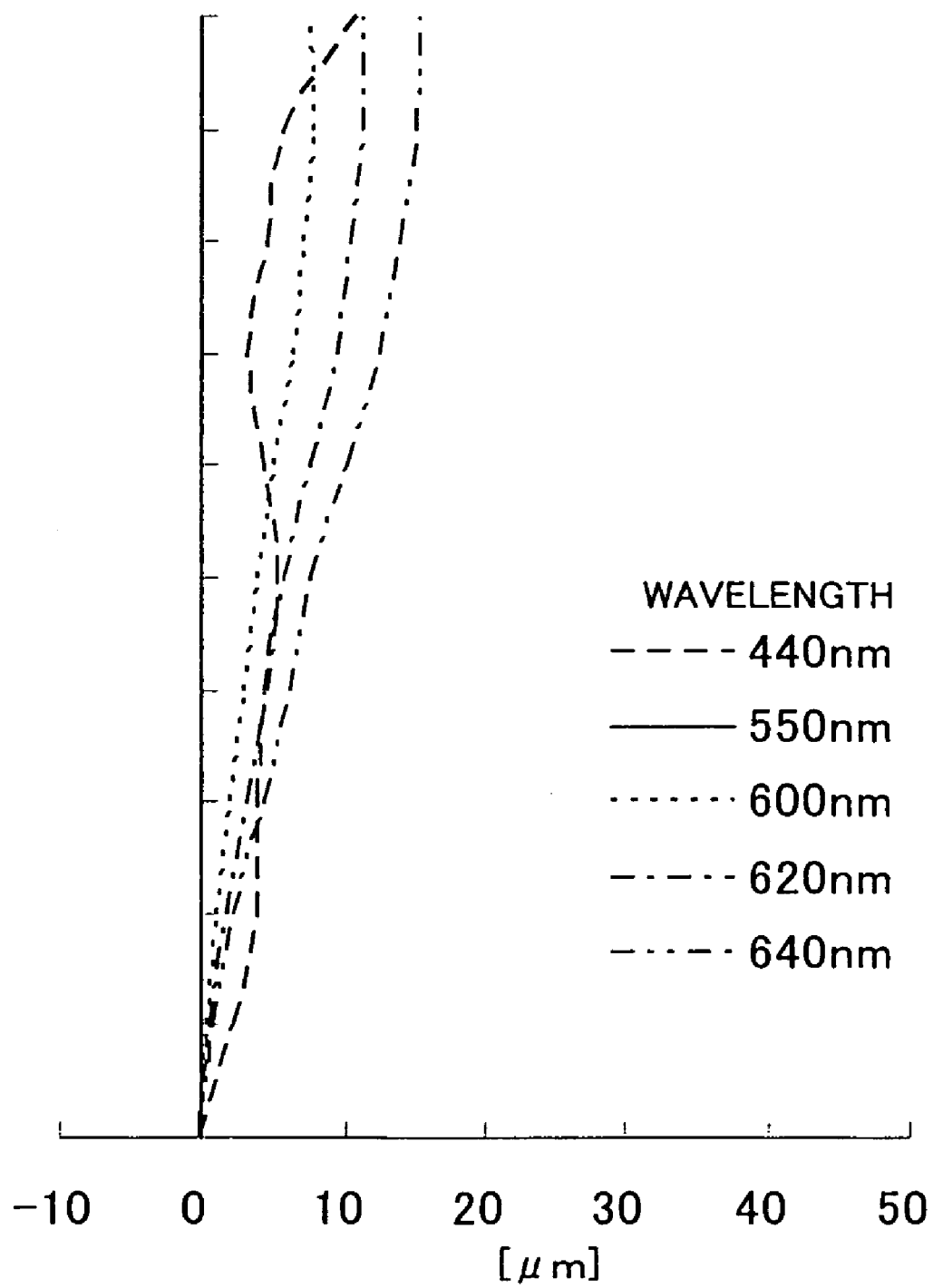
FIG. 33 is a diagram showing deviations on the light valve corresponding to amounts of the magnification chromatic aberrations optically compensated by the projection optical system according to the eighth embodiment.

FIG. 33 is a diagram showing deviations on the light valve 4 corresponding to amounts of the magnification chromatic aberrations optically compensated by the projection optical system 800 according to the eighth embodiment. In FIG. 33, a vertical axis indicates an angle of view, and a horizontal axis indicates a deviation on the light valve 4 corresponding to an amount of the magnification chromatic aberration of the projection optical system 800 (i.e., a length on the light valve 4 corresponding to a deviation on the screen 6 resulting from the magnification chromatic aberration of the projection optical system 800). FIG. 33 shows deviations on the light valve 4 corresponding to amounts of the magnification chromatic aberrations of a green light (550 nm), which is superimposed on the vertical axis, a blue light (440 nm) relative to the green light (550 nm), a light having a minimum wavelength (600 nm) of a red light relative to the green light (550 nm), a light having a central wavelength (620 nm) of the red light relative to the green light (550 nm), and a light having a maximum wavelength (640 nm) of the red light relative to the green light (550 nm).

As can be understood from FIG. 33, at the maximum angle of view, an amount $\Delta L_{B-G}$ of the magnification chromatic aberration (i.e., a length $\Delta L_{B-G}$ on the light valve 4 corresponding to a deviation on the screen 6 resulting from the magnification chromatic aberration of the projection optical system 800) of the blue light (440 nm) relative to the green light (550 nm) is approximately the same as an amount $\Delta L_{Rm-G}$ of the magnification chromatic aberration (i.e. a length $\Delta L_{Rm-G}$ on the light valve 4 corresponding to a deviation on the screen 6 resulting from the magnification chromatic aberration of the projection optical system 800) of the light having a central wavelength (620 nm) of the red light relative to the green light (550 nm). The amount $\Delta L_{B-G}$ of the magnification chromatic aberration is 11.0 μm, and the amount $\Delta L_{Rm-G}$ of the magnification chromatic aberration is 11.5 μm. Furthermore, as can be understood from FIG. 33, at the maximum angle of view, an amount $\Delta L_{Rl-Rs}$ of the magnification chromatic aberration (i.e., a length $\Delta L_{Rl-Rs}$ on the light valve 4 corresponding to a deviation on the screen 6 resulting from the magnification chromatic aberration of the projection optical system 800) of the light having a maximum wavelength (640 nm) of the red light relative to the light having a minimum wavelength (600 nm) of the red light is 7.7 μm.

In the eighth embodiment, when the fixed-pixel pitch P of the light valve 4 is a length of 10 μm, the projection optical system 800 satisfies the following conditional equations $$\Delta L_{B-G} > P,$$

$$\Delta L_{Rm-G} > P,$$

and $$\Delta L_{Rl-Rs} \leq P$$

As described above, in the projection optical system 800 of the eighth embodiment, the amount $\Delta L_{B-G}$ of the magnification chromatic aberration of the blue light (B) relative to the green light (G) is 11.0 μm and the amount $\Delta L_{Rm-G}$ of the magnification chromatic aberration of the light (Rm) having a central wavelength of the red light relative to the green light (G) are 11.5 μm. A fixed-pixel pitch P is 10 μm, and an allowable color deviation is a length of 1 pixel or below. Therefore, the image projection apparatus can reduce a color deviation on the screen 6 sufficiently by causing the image processing device 2 to compensate the pixel display position information so as to shift the red pixel and the blue pixel by a length of 1 pixel on the screen 6 (which corresponds to 1 fixed-pixel pitch on the light valve 4).

Further, since the amount $\Delta L_{Rl-Rs}$ of the magnification chromatic aberration (600 nm to 640 nm) within the red light is 7.7 μm at maximum, which is smaller than the fixed-pixel pitch P, a red color blur becomes insignificant.

As described above, in the image projection apparatus of the eighth embodiment, since the pixel display position information of the input video signal V1 is image-processed for each color and the compensated video signal V2 that has been compensated in advance is generated, it is not required the projection optical system 800 be formed so as to reduce the magnification chromatic aberration to a very low level. Therefore, the projection optical system 800 with a wide angle of view and with no anomalous dispersion glass can be implemented, and the image projection apparatus at a reduced cost and a short projection distance lp can be obtained.

Further, in the eighth embodiment, since the image projection apparatus adopts the optical projection system 800 that can suppress the amount $\Delta L_{Rl-Rs}$ of the magnification chromatic aberration within the red light to a length within 1 fixed-pixel pitch, an image with little color blur can be displayed on the screen 6.

Furthermore, in the eighth embodiment, since the projection optical system 800 optically compensates the amount $\Delta L_{Rm-G}$ of the magnification chromatic aberration of the red light relative to the green light sufficiently and the amount $\Delta L_{B-G}$ of the magnification chromatic aberration of the blue light relative to the green light within a length of several pixels, the image processing device 2 may compensates the pixel display positions of the blue image by image-processing. As a result, the image processing can be simplified and a memory capacity of the line memory 22 of the image processing device can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image projection apparatus comprising:
   an image processing device receiving an input video signal and image-processing the received input video signal to generate a compensated video signal;
   an illuminating device sequentially emitting a red light, a green light, and a blue light, as an illuminating light, the red light having a continuous spectrum in a red wavelength range, the green light having an emission-line spectrum in a green wavelength range, the blue light having an emission-line spectrum in a blue wavelength range;
   a light valve including a plurality of fixed pixels arranged two-dimensionally with a predetermined fixed-pixel pitch and receiving the compensated video signal, the plurality of fixed pixels modulating the illuminating light to sequentially produce a red image light from the red light, a green image light from the green light, and a blue image light from the blue light in accordance with the received compensated video signal; and
   a projection optical system sequentially receiving the red image light, the green image light, and the blue image light, and magnifying and projecting the red image light, the green image light, and the blue image light on the screen, a magnification chromatic aberration for each color being induced in the projection optical system;
   wherein the projection optical system is formed in such a way that at least one of a first deviation as a length on the light valve corresponding to an amount of the magnification chromatic aberration of a light having a central wavelength of the red light relative to the green light and a second deviation as a length on the light valve corresponding to an amount of the magnification chromatic aberration of the blue light relative to the green light is larger than a fixed-pixel pitch between adjacent fixed pixels of the light valve, and a third deviation as a length on the light valve corresponding to an amount of the magnification chromatic aberration of a light having a maximum wavelength of the red light relative to a light having a minimum wavelength of the red light is not larger than the fixed-pixel pitch;
   wherein the image processing device includes a compensation data memory storing compensation data determined in advance in accordance with the projection optical system, and a signal processor performing the image-processing using the stored compensation data to produce the compensated video signal, the first deviation and/or the second deviation being eliminated by supplying the compensated video signal to the light valve.

2. The image projection apparatus according to claim 1, wherein the compensated video signal is produced so as to eliminate a fourth deviation of the green light resulting from distortion induced in the projection optical system in addition to said eliminating of the first deviation and/or the second deviation.

3. The image projection apparatus according to claim 1, wherein the projection optical system satisfies the following conditional equations $$\Delta L_{B-G} > P,$$

and $$\Delta L_{Rm-G} > P,$$

where $\Delta L_{B-G}$ represents the second deviation, $\Delta L_{Rm-G}$ represents the first deviation, and P represents the fixed-pixel pitch.

4. The image projection apparatus according to claim 1, wherein the projection optical system satisfies the following conditional equations $$\Delta L_{B-G} \leq P,$$

and $$\Delta L_{Rm-G} > P,$$

where $\Delta L_{B-G}$ represents the second deviation, $\Delta L_{Rm-G}$ represents the first deviation, and P represents the fixed-pixel pitch.

5. The image projection apparatus according to claim 1, wherein the projection optical system satisfies the following conditional equations $$\Delta L_{B-G} > P,$$

and $$\Delta L_{Rm-G} \leq P,$$

where $\Delta L_{B-G}$ represents the second deviation, $\Delta L_{Rm-G}$ represents the first deviation, and P represents the fixed-pixel pitch.

6. The image projection apparatus according to claim 1, wherein the projection optical system further comprises, in an order from a magnification side that is a side of the screen:
   a first group having negative refractive power;
   a second group having positive refractive power; and
   a third group having positive refractive power.

7. The image projection apparatus according to claim 6, wherein the projection optical system satisfies the following conditional equations $$-2.5 < f_1/f < -1.8,$$

$$10 < f_2/f < 12,$$

and $$5.5 < f_3/f < 6.0,$$

where
   f represents a focal length of an entire system of the projection optical system,
   $f_1$ represents a focal length of the first group,
   $f_2$ represents a focal length of the second group, and
   $f_3$ represents a focal length of the third group.

8. The image projection apparatus according to claim 6, wherein the first group includes an aspherical lens disposed at a position nearest to the magnification side.

9. The image projection apparatus according to claim 6, wherein the third group includes at least one set of cemented lenses including a positive lens and a negative lens.

10. The image projection apparatus according to claim 6, wherein the third group includes at least one positive lens satisfying the following conditional equation $$60 < v_d < 80$$

where $v_d$ represents an Abbe number for d-line.

11. A projection optical system comprising an optical member sequentially receiving a red image light, a green image light, and a blue image light from a light valve including a plurality of fixed pixels arranged two-dimensionally with a predetermined fixed-pixel pitch and receiving a compensated video signal from an image processing device, the optical member magnifying and projecting the red image light, the green image light, and the blue image light on a screen, a magnification chromatic aberration for each color being induced in the optical member;
   wherein the optical member is formed in such a way that at least one of a first deviation as a length on the light valve corresponding to an amount of the magnification chromatic aberration of a light having a central wavelength of the red light relative to the green light and a second deviation as a length on the light valve corresponding to an amount of the magnification chromatic aberration of the blue light relative to the green light is larger than a fixed-pixel pitch between adjacent fixed pixels of the light valve, and a third deviation as a length on the light valve corresponding to an amount of the magnification chromatic aberration of a light having a maximum wavelength of the red light relative to a light having a minimum wavelength of the red light is not larger than the fixed-pixel pitch.

12. The projection optical system according to claim 11, wherein the following conditional equations, $$\Delta L_{B-G} > P,$$

and $$\Delta L_{Rm-G} > P$$

are satisfied, where $\Delta L_{B-G}$ represents the second deviation, $\Delta L_{Rm-G}$ represents the first deviation, and P represents the fixed-pixel pitch.

13. The projection optical system according to claim 11, wherein the following conditional equations, $$\Delta L_{B-G} \leq P,$$

and $$\Delta L_{Rm-G} > P$$

are satisfied, where $\Delta L_{B-G}$ represents the second deviation, $\Delta L_{Rm-G}$ represents the first deviation, and P represents the fixed-pixel pitch.

14. The projection optical system according to claim 11, wherein the following conditional equations, $$\Delta L_{B-G} > P,$$

and $$\Delta L_{Rm-G} \leq P$$

are satisfied, where $\Delta L_{B-G}$ represents the second deviation, $\Delta L_{Rm-G}$ represents the first deviation, and P represents the fixed-pixel pitch.

15. The projection optical system according to claim 11, wherein the projection optical system further comprises, in an order from a magnification side that is a side of the screen:
a first group having negative refractive power;
a second group having positive refractive power; and
a third group having positive refractive power.

16. The projection optical system according to claim 15, wherein the following conditional equations $$-2.5 < f_1/f < -1.8,$$

$$10 < f_2/f < 12, \text{ and}$$

$$5.5 < f_3/f < 6.0$$

are satisfied, where
f represents a focal length of an entire system of the projection optical system,
$f_1$ represents a focal length of the first group,
$f_2$ represents a focal length of the second group, and
$f_3$ represents a focal length of the third group.

17. The projection optical system according to claim 15, wherein the first group includes an aspherical lens disposed at a position nearest to the magnification side.

18. The projection optical system according to claim 15, wherein the third group includes at least one set of cemented lenses including a positive lens and a negative lens.

19. The projection optical system according to claim 15, wherein the third group includes at least one positive lens satisfying the following conditional equation $$60 < v_d < 80$$

where $v_d$ represents an Abbe number for d-line.

* * * * *